United States Patent [19]
Imura et al.

[11] Patent Number: 5,974,270
[45] Date of Patent: Oct. 26, 1999

[54] MOTION COMPENSATION DEVICE FOR AN OPTICAL SYSTEM AND METHOD

[75] Inventors: Yoshio Imura; Hideki Kanbayashi, both of Kawasaki, Japan

[73] Assignee: Nikon Corporation, Tokyo, Japan

[21] Appl. No.: 08/998,028

[22] Filed: Dec. 24, 1997

[30] Foreign Application Priority Data

Dec. 26, 1996 [JP] Japan ................................ 8-348722

[51] Int. Cl.$^6$ .................................................... G03B 17/00
[52] U.S. Cl. ............................................................ 396/55
[58] Field of Search ............................... 396/55; 348/208

[56] References Cited

U.S. PATENT DOCUMENTS

| | | | |
|---|---|---|---|
| 4,731,669 | 3/1988 | Hayashi et al. | 348/208 |
| 5,633,756 | 5/1997 | Kaneda et al. | 396/55 X |
| 5,758,203 | 5/1998 | Konno | 396/55 |
| 5,771,407 | 6/1998 | Imafuji et al. | 396/55 |
| 5,842,052 | 11/1998 | Okano | 396/55 |

FOREIGN PATENT DOCUMENTS 6-67274   3/1994   Japan .

*Primary Examiner*—W. B. Perkey

[57] ABSTRACT

A motion compensation device, suitable for an optical system such as a camera, has a blurring motion compensation unit to compensate for blurring motion by driving an image blurring motion compensation optical system in a direction generally perpendicular to the optical axis. The device can lock the image blurring motion compensation optical system by a locking member even if there is no power supply. This is accomplished by using a magnet which attracts an iron piece mounted on a blurring motion compensation lens frame, and lock members which lock the blurring motion compensation lens frame. When an operation mode changeover switch changes over from the ON position to the OFF position, a contact unit of this operation mode changeover switch locks a coupling member of a lock ring. Accordingly, because the magnet attracts the iron piece even when there is no power supply, the blurring motion compensation lens frame can be locked by the lock ring.

36 Claims, 13 Drawing Sheets

MOTION COMPENSATION DEVICE FOR AN OPTICAL SYSTEM AND METHOD

CROSS-REFERENCE TO RELATED APPLICATIONS

This application is based upon and claims priority of Japanese Patent Application No. 08-348722 filed Dec. 26, 1996, the contents of which are incorporated herein by reference.

BACKGROUND OF THE INVENTION

1. Field of the Invention

The present invention relates to a motion compensation device and method which compensates for hand tremor motions and other sources of image blurring motion and vibration in a camera and related optical systems.

2. Description of the Related Art

Optical systems project an image onto an image plane. Conventional image blur suppression device suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system. Conventional cameras use a motion compensation device to suppress image blur resulting from motion of the camera. Such motion is typically caused by hand tremors of the photographer.

A motion compensation device in the prior art has a structure as disclosed in Japanese Laid-Open Patent Publication JP-6-67274. In JP-6-67274, a motion compensation device is disclosed which is equipped with a blurring motion compensation lens, and a blurring motion compensation lens frame which supports the blurring motion compensation lens. A blurring motion compensation lens drive mechanism is used to drive this blurring motion compensation lens frame. A convex locking member fits into a concave surface formed in this blurring motion compensation lens frame and locks the blurring motion compensation lens frame. Driving the locking member is a locking member drive mechanism which engages or releases the locking member and the concave surface. This locking member drive mechanism is equipped with a slide which moves rectilinearly, a permanent magnet, a solenoid coil and an assembled plunger-type latch solenoid. This plunger-type latch solenoid, when properly electrified, cancels the magnetic field of the permanent magnet and operates to release the locking member from the concave surface. The plunger-type latch solenoid, when properly electrified, also can increase the magnetic force of the permanent magnet and operates to engage the locking member and the concave surface.

In the motion compensation device of Japanese Laid-Open Patent Publication JP-6-67274, when a discrimination unit determines that the blurring motion compensation lens is not locked, the blurring motion compensation lens frame is locked by an electrical locking device. When a defect occurs in the locking member drive mechanism, the electrical locking device locks the blurring motion compensation lens frame so that the optical axis of the whole photographic optical system and the optical axis of the blurring motion compensation lens coincide. In such a situation, it is possible to perform normal photography. Also using this method, damage to the blurring motion compensation lens due to vibration and failure of the blurring motion compensation lens drive mechanism are prevented.

The prior art motion compensation device, however, makes it necessary to engage or release the locking member from the concave surface by the electrically conducting state of the plunger-type solenoid. Moreover, the prior art motion compensation device makes it necessary to lock the blurring motion compensation lens frame by the electrical locking device when the blurring motion compensation lens frame could not be locked by a locking member drive mechanism. Accordingly, the prior art motion compensation device necessitates an electric power source in order to drive the locking member drive mechanism and to drive the electrical locking device. Generally, in a camera system comprising a lens body and a camera body in which the lens body is interchangeable, a motion compensation device on the lens barrel itself has a power supply disposed in the camera body. Since the power supply, normally a battery, is not contained in the lens barrel where the blurring motion compensation lens frame is located, when the power supply battery of the camera body is removed or the lens barrel is removed from the camera body, the problem arises of not being able to lock the blurring motion compensation lens frame using the locking member drive mechanism or the electrical locking mechanism.

SUMMARY OF THE INVENTION

An object of the present invention is to provide a motion compensation device which can lock the blurring motion compensation optical system in a given position without the use of electrical power.

Objects and advantages of the present invention are achieved in accordance with embodiments of the present invention by a motion compensation device suitable for an optical system that comprises a blurring motion compensation unit to compensate for blurring motion by driving a blurring motion compensation optical system in a direction substantially at a right angle to the optical axis, and a locking actuation member to cause locking of said blurring motion compensation optical system without requiring a power supply.

Further objects and advantages of the present invention are achieved in accordance with embodiments of the present invention by a motion compensation device suitable for an optical system that comprises a blurring motion compensation unit to compensate for blurring motion by driving a blurring motion compensation optical system in a direction substantially at a right angle to the optical axis, a locking member to lock the blurring motion compensation optical system, and a locking actuation member to cause locking of said blurring motion compensation optical system by use of the locking member independent of the operation of the blurring motion compensation optical system.

Still further objects and advantages of the present invention are achieved in accordance with embodiments of the present invention by a motion compensation device suitable for an optical system that comprises a blurring motion compensation unit to compensate for blurring motion by driving a blurring motion compensation optical system in a direction substantially at a right angle to the optical axis, a locking member to lock the blurring motion compensation optical system, a control unit to control the operation of the locking member, and a locking actuation member to cause locking of the blurring motion compensation optical system by using the locking member, independent of the control operation of the control unit.

In accordance with embodiments of the present invention, the motion compensation device and method includes a movement device which moves the blurring motion compensation optical system in the optical axis direction. The locking actuation member, unrelated to the movement position of the blurring motion compensation optical system, causes locking of this blurring motion compensation optical system by the locking member.

In accordance with further embodiments of the present invention, the motion compensation device and method include the locking actuation member which comprises a blurring motion compensation operation changeover member which changes the operation of the blurring motion compensation unit operating modes, and a coupling unit which, coupling the blurring motion compensation operation changeover operation unit and causes locking of the blurring motion compensation optical system by the locking member, unrelated to the control operation of the control unit.

In accordance with still further embodiments of the present invention, the motion compensation device and method include a coupling unit that further comprises, a coupling member extending in the direction of motion of said blurring motion compensation optical system and disposed in the blurring motion compensation optical system or in the blurring motion compensation operation changeover member, and a contact member to come into contact with a linkage member, disposed in the blurring motion compensation operation changeover member or in the blurring motion compensation optical system, the coupling member or the contact member locking the blurring motion compensation optical system, switching the blurring motion compensation operation changeover member to the changeover operation in the specific operation mode, and making contact with the contact member or the coupling member.

In accordance with another embodiment of the present invention, the motion compensation device and method includes the coupling unit which is equipped with a free member which lies in the optical axis direction, and a support member supported by the blurring motion compensation optical system or by the operation changeover member. The contact member, in the support member, comes into contact with the moving member.

BRIEF DESCRIPTION OF THE DRAWINGS

These and other objects and advantages of the invention will become apparent and more readily appreciated for the following description of the preferred embodiments, taken in conjunction with the accompanying of which.

DESCRIPTION OF THE PREFERRED EMBODIMENTS

Figure 1:
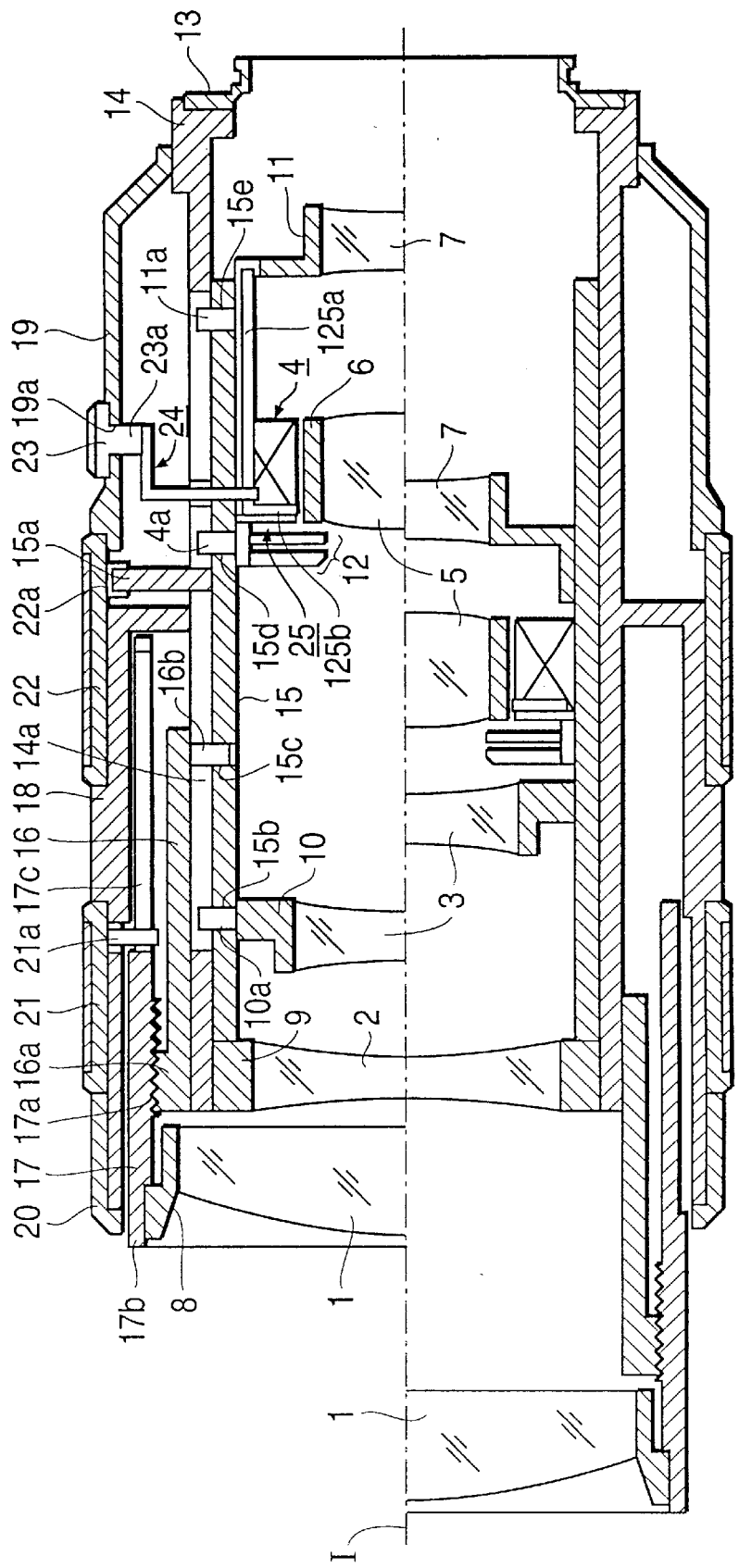
FIG. 1 is a cross sectional diagram showing a lens barrel with a motion compensation device according to a first preferred embodiment of the present invention.

Reference will now be made in detail to the preferred embodiments of the present invention, examples of which are illustrated in the accompanying drawings, wherein like reference numerals refer to like elements throughout.

First Preferred Embodiment

Referring to FIG. 1, a lens barrel having a motion compensation device according to a first preferred embodiment of the present invention is shown. A lens barrel, for example, is commonly used in a camera system. By moving in the same direction as the optical axis I, a first lens group (focusing lens) 1 forms an image of the subject on an imaging surface. A second lens group 2, and a third lens group 3 are also shown. A fourth lens group 5 (termed hereinafter "blurring motion compensation lens") compensates for blurring motion by moving in a direction at right angles to the optical axis I. Also shown is a fifth lens group 7, and an aperture 12 which limits the intensity of light entering the camera. The foregoing lens groups constitute a five group zoom lens. The lens barrel performs zooming (variable magnification) by movement in the optical axis I direction of the first lens group 1, third lens group 3, aperture 12, blurring motion compensation lens 5, blurring motion compensation lens drive mechanism 4 and the fifth lens group 7. Furthermore, when the lens barrel performs zooming, the blurring motion compensation lens 5, the blurring motion compensation lens drive mechanism 4, and the aperture 12 move in the optical axis I direction without changing their relative position to one another.

The lens barrel is made of an inner lock tube 14, an outer lock tube 18 mounted outside this inner lock tube 14, a cover 19 mounted outside this inner lock tube 14, a cam tube 15, a lens group movement frame 8 which supports the first lens group, a helicoid ring 17, a range finder ring 21, a zoom ring 22, a blurring motion compensation lens drive mechanism 14, and an operation mode changeover switch 23.

The inner lock tube 14 supports a first lens group movement tube 16 which is freely movable in the direction of the optical axis I. Within the inner lock tube 14 are found pins 10a, 16b, 4a and 11a which are movably inserted, a rectilinear groove 14a parallel to the optical axis I, and a mount member 13 which is capable of installation in a camera body (not shown in the drawing). The second lens group support frame 9 which supports the second lens group is mounted in the inner circumference of the inner lock tube 14, and is freely rotatable around the optical axis I with a cam tube 15. The internal circumference of a helicoid ring 17 is supported on the external circumference of the inner lock tube 14, and is freely movable in the direction of the optical axis I.

The outer lock tube 18 supports freely rotatable a range finder ring 21 and a zoom ring 22. The inner circumferential surface of the range finder ring 21 and the inner circumferential surface of the zoom ring 22 are supported and freely rotatable on the outer circumferential surface of the outer lock tube 18. A cover 19 is fixed in order to support the range finder ring 21 which is also freely rotatable.

The range finder ring 21 is actuated when adjusting the focal point of the image of the subject on the imaging surface (not shown in the drawing). A pin 21a is formed, protruding from the internal circumferential portion of the range finder ring 21 engaging with an engagement unit 17c protruding from the helicoid ring 17, and penetrating a circumferential groove formed in the circumferential direction of the outer lock tube 18.

The zoom ring 22 is utilized when photographing and continuously changes the focal distance. The zoom ring 22, on a mount member 13 end, is supported in the cover 19 for free rotation. In the interior of the zoom ring 22, between the outer lock tube 18 and the cover 19, an engagement unit 22a is formed which engages the end of a projecting pin 15a.

The cam tube 15 confers driving force to drive, in the optical axis I direction, the first lens movement tube 16, the third lens group frame 10 which supports the third lens group, the blurring motion compensation lens frame 6, the blurring motion compensation lens drive mechanism 4, the aperture 12, and the fifth lens group movement frame 11 which supports the fifth lens group. In the cam tube 15, a pin 16b disposed protruding in the internal circumference of the first lens group movement tube 16, a pin 10a protruding in the external circumference of the third lens group frame 10, a pin 4a protruding in the external circumference of the blurring motion compensation lens frame 6, the blurring motion compensation lens drive mechanism 4, the aperture 12, and a pin 11a protruding in the external circumference of the fifth lens group movement frame 11, are respectively formed for free movement and insertable into the cam grooves 15b, 15c, 15d and 15e. In the internal circumference of the cam tube 15, the third lens group movement frame 10, the blurring motion compensation mechanism unit 4, the aperture 12 and the outer circumference of the fifth lens group movement frame 11 are supported and freely movable in the optical axis I direction. In the outer circumference of the cam tube 15, a projecting pin 15a is inserted through a circumferential groove formed in the circumferential direction between the outer lock tube 18 and the cover 19, and fitting into the engagement member 22a of the zoom ring 22.

The helicoid ring 17 moves the first lens group movement frame 8, which supports the first lens group 1, in the optical axis I direction. In the internal circumferential portion of the helicoid ring 17, the first lens group movement frame 8 is mounted in its end portion. Moreover, in the internal circumference of the helicoid ring 17, a male helicoid screw 16a formed in the outer circumference of the first lens group movement tube 16 is in threaded engagement with the female helicoid screw 17a.

The blurring motion compensation lens drive mechanism 4 is a mechanism used to compensate for blurring motion, and drives the blurring motion compensation lens 5, which constitutes a portion of the photographic optical system, in a direction at right angles with respect to the optical axis I.

Figure 2:
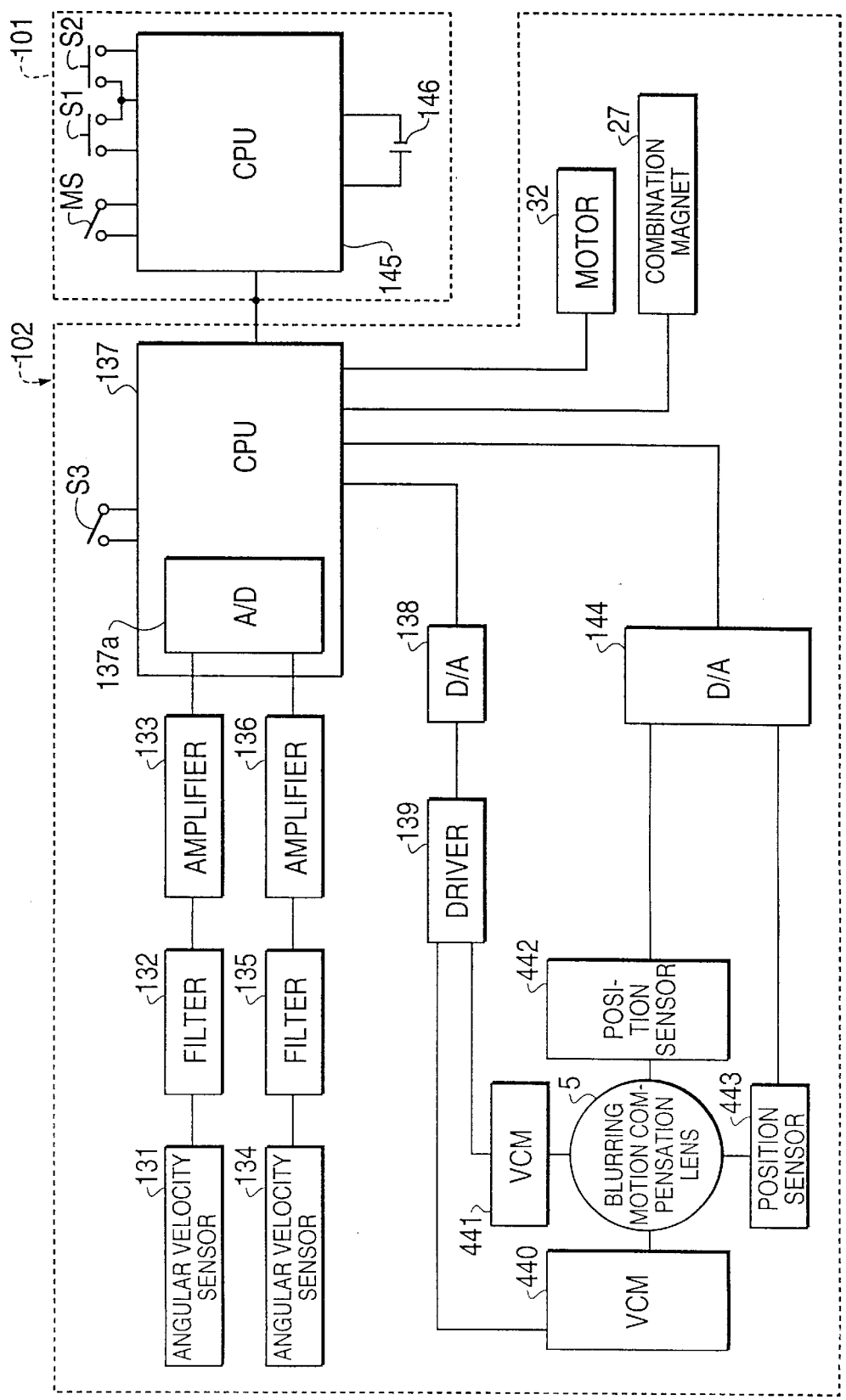
FIG. 2 is a block diagram of the blurring motion compensation device according to a first preferred embodiment of the present invention.

Referring to FIG. 2, a block diagram of a blurring motion compensation device according to a first preferred embodiment of the present invention is shown.

Angular velocity sensors 131 and 134 are used to detect the vibration in directions parallel to, and perpendicular to, a camera body 101 and a lens barrel 120. The outputs of these angular sensors pass through respective filters 132 and 315, are amplified by amplifiers 133 and 136, and are input to a CPU 137. The CPU 137, after A/D converting the input signals by a built-in A/D converter 137a, performs predetermined processes, and generates a blurring motion compensation control signal. The output from the CPU 137, having been D/A converted by a D/A converter 138, is input via a driver 139 to voice coil motors (VCM) 440 and 441.

Figure 3:
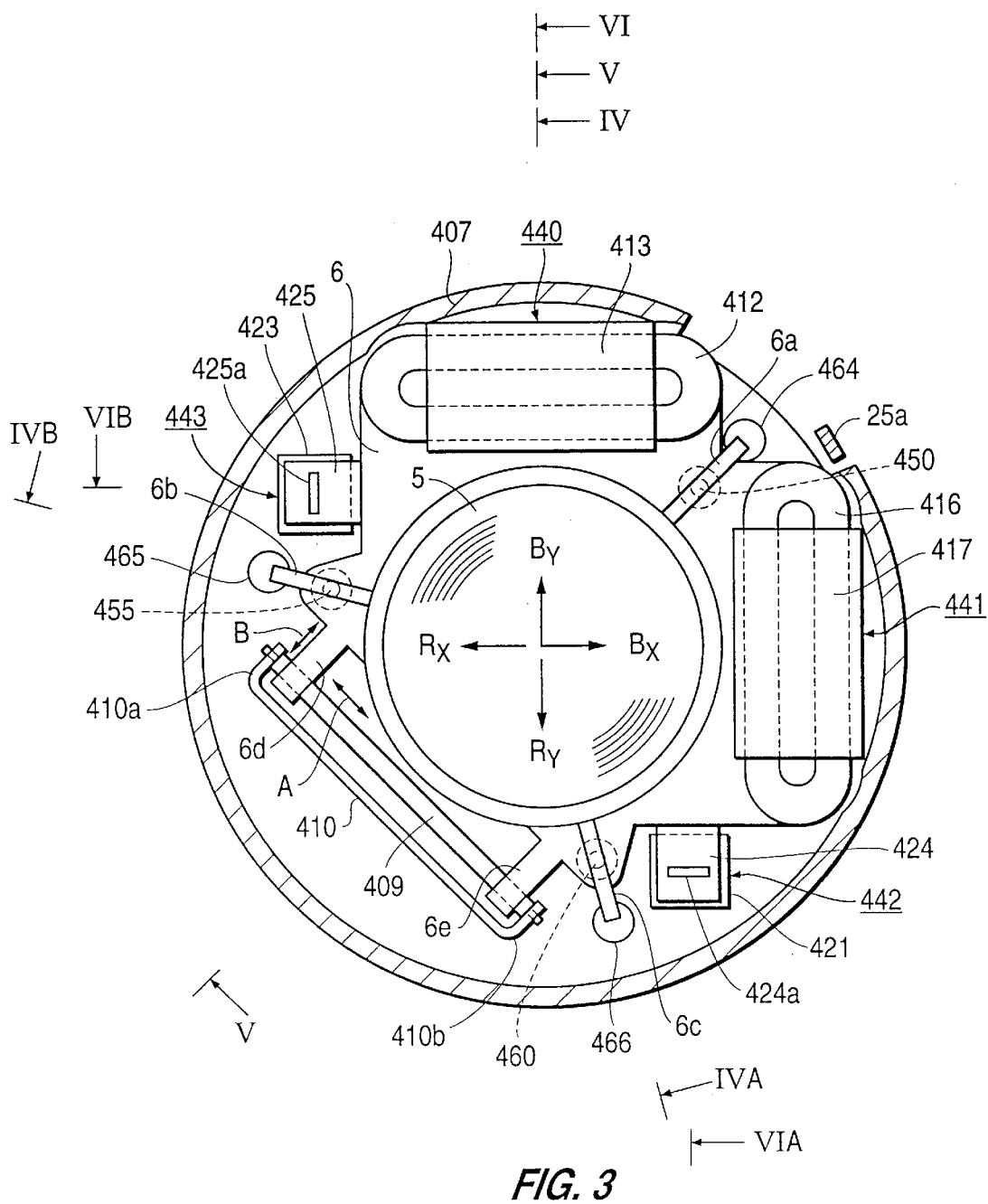
FIG. 3 is a schematic cross sectional diagram showing the motion compensation device according to a first preferred embodiment of the present invention.
Figure 4:
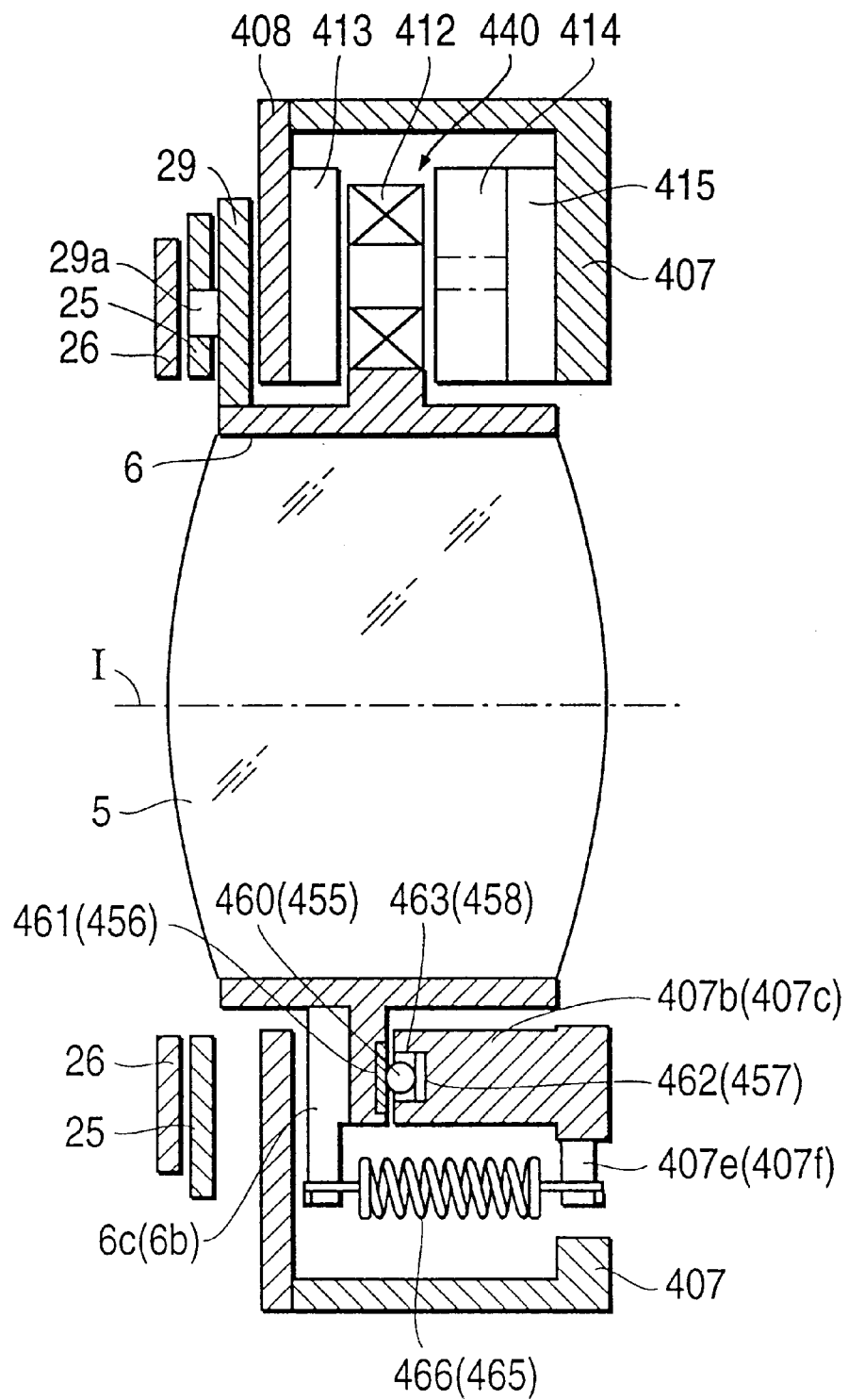
FIG. 4 is a cross sectional diagram of the motion compensation device, taken along lines IV–IVA of FIG. 3.

The voice coil motors 440 and 441 are motors which drive the blurring motion compensation lens 5 and are shown FIG. 3 and FIG. 4. The detection signals of position sensors 442, 443 are A/D converted by the AND converter 144 as feedback to the CPU 137. A changeover switch S3 connected to an operation mode changeover switch 23, a motor 32 rotates a charge ring 26, and a combination magnet 27 which adheres to an iron piece 27a of a lock ring 25, and are connected to the CPU 137.

The camera body 101 is equipped with a CPU 145 which directs all the various controls of the camera system. Connected to the CPU 145 are a main switch (power supply switch) MS, a half depression switch S1 which is set ON by half depression of the release button, and a full depression switch S2 which is set ON by full depression of the release button. The CPU 145 is in communication with the CPU 137 and can transmit information to CPU 137.

Figure 5:
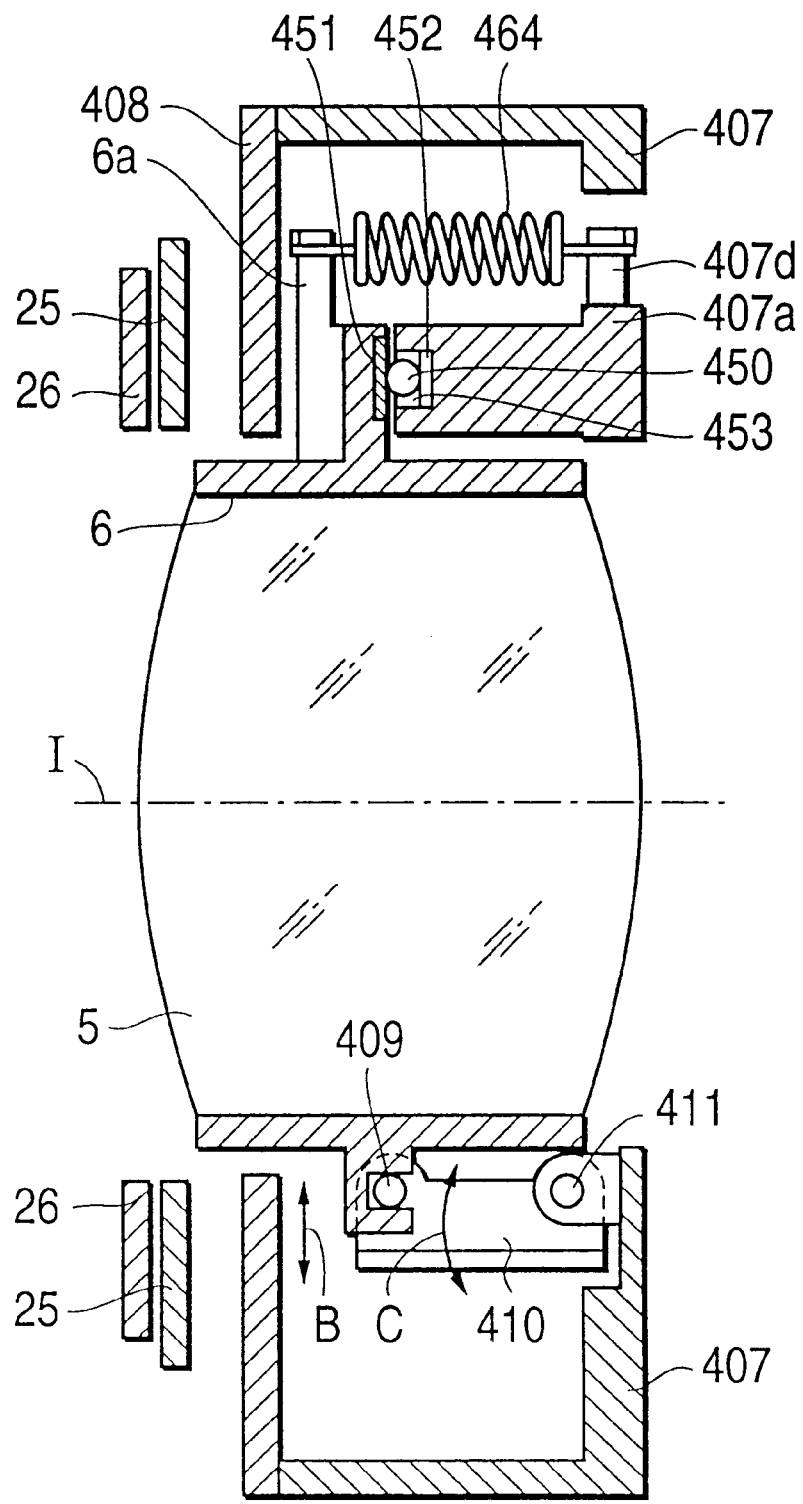
FIG. 5 is a cross sectional diagram of the motion compensation device, taken along lines V—V of FIG. 3.

FIG. 3 is a cross sectional diagram showing a motion compensation device according to a first preferred embodiment of the present invention. FIG. 4 is a cross sectional diagram along the line IV–IVA of FIG. 3. FIG. 5 is a cross sectional diagram along the line V—V of FIG. 3. Further, in FIG. 4, the symbols of the members in the cross sectional plane sectioned along the line IV–IVB of FIG. 3, are shown in FIG. 4.

The blurring motion compensation lens frame 6 is a frame which supports the blurring motion compensation lens 5. As shown in FIG. 3, on the outer circumferential surface of the blurring motion compensation lens frame 6, springs 464, 465 and 466, spring suspension units 6a, 6b and 6c, and hook units 6d and 6e are attached. As shown in FIG. 3, in the outer circumference of the blurring motion compensation lens frame 6, the slit members of position sensors 442 and 443 (also shown in FIG. 4), the coils 412 and 416 of voice coil motors 440 and 441 (also shown in FIG. 4 and FIG. 5), and steel ball receiving members 451, 456 and 461 are attached to steel balls 450, 455 and 460.

The steel ball receiving members 451, 456 and 461 guide the movement of the blurring motion compensation lens frame 6 when driving the blurring motion compensation lens frame 6 in a direction at right angles to the optical axis I. The steel ball receiving members 451, 465 and 461 are in contact with respective steel balls 450, 455 and 460, such that they can smoothly perform movement of the blurring motion compensation lens frame 6. The steel ball receiving members 451, 456 and 461 are formed of a metal of higher hardness than the steel balls 450, 455 and 460.

Figure 6:
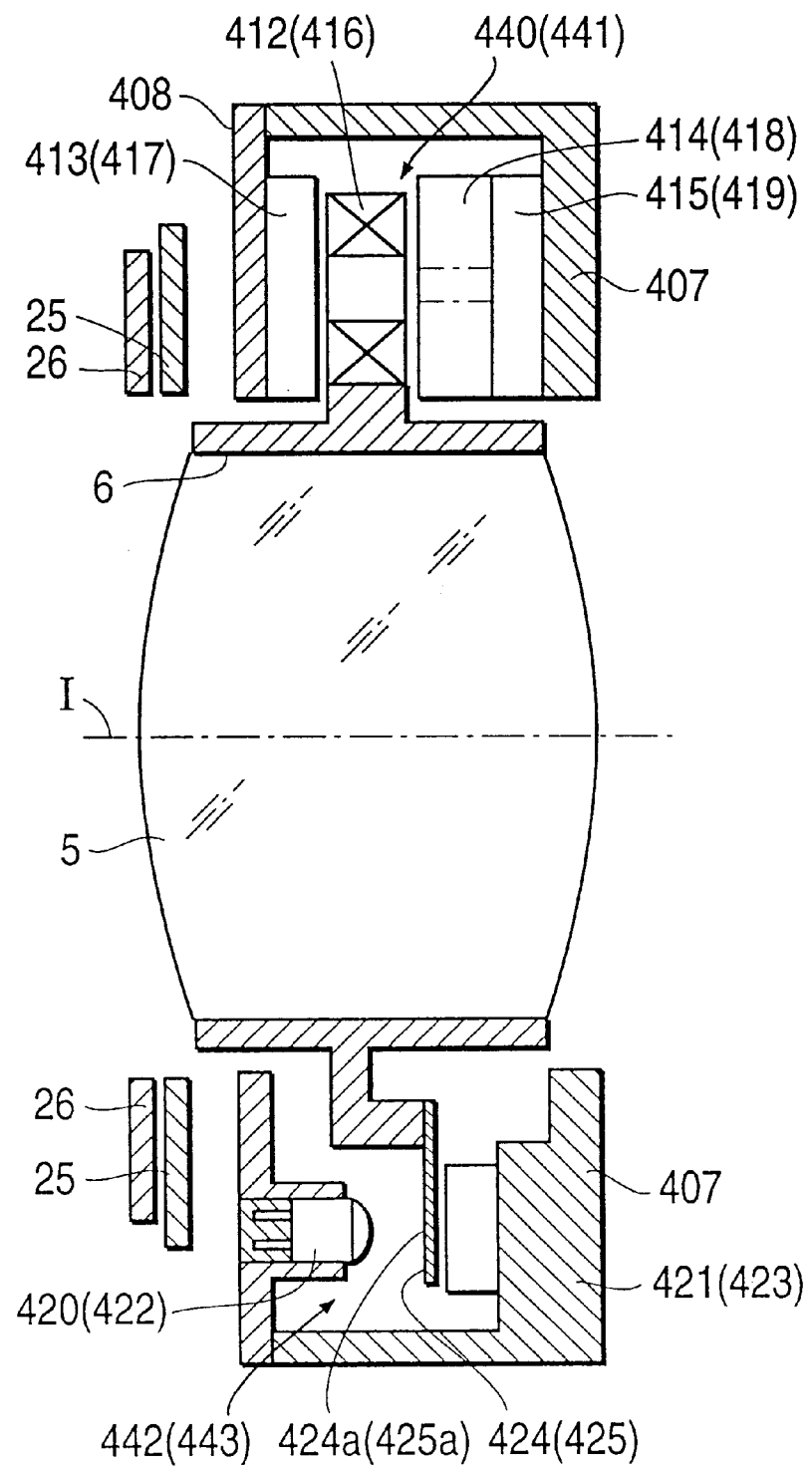
FIG. 6 is a cross sectional diagram of the motion compensation device, taken along lines VI–VIA of FIG. 3.

The base frame 407 houses and protects the blurring motion compensation lens drive mechanism which comprises the voice coil motors 440 and 441 which drive the blurring motion compensation lens frame 6 and blurring motion compensation lens 5, the guide shaft 409, and springs 464, 465 and 466. In the base frame 407, as shown in FIG. 4 and FIG. 5, can be found spring suspension units 407*d*, 407*e* and 407*f*, steel ball insertion units 407*a*, 407*b* and 407*c*, and the other ends of the springs 464, 465 and 466, a shaft 409 (as shown in FIGS. 4–6), the yokes 415 and 419 of the voice coil motors 440 and 441, and the light receiving elements of the position sensors 442 and 443 are mounted.

The frame member 408 protects the blurring motion compensation lens frame 6 and the blurring motion compensation lens drive mechanism 4 which are housed in the base frame 407. As shown in FIG. 4 and FIG. 6, on the inside surface of the frame member 408 there are mounted, yokes 413 and 417 of the voice coil motors 440 and 441, and the light emitting elements 420 and 422 of the position sensors 442 and 443.

A guide shaft 409 guides the blurring motion compensation lens frame 6 when this blurring motion compensation lens frame 6 moves in a direction perpendicular to the optical axis I. As shown in FIG. 3, guide shaft 409 is located in direction A which intersects at an angle other than a right angle either of the $B_X$ direction and the $B_Y$ direction. Also hook units 6*d* and 6*e* are shown in FIG. 3 and engage to freely slide on the guide shaft 409.

A guide arm 410 moves the blurring motion compensation lens frame 6 parallel with respect to the guide direction (direction A in FIG. 3) of the guide shaft 409. The guide arm 410 has bent parts 410*a* and 410*b* at both ends. The guide shaft 409 is supported and freely rotatable by these bent parts 410*a* and 410*b*. As shown in FIG. 5, the guide arm 410 is supported by the shaft 411 and allows free rotation of the end portion of the base frame side 407 in direction C. By rotating this guide arm 410, the blurring motion compensation lens frame 6 can move in direction B which intersects the guide in direction A of the guide shaft 409.

As shown in FIG. 3, the voice coil motors 440 and 441, are motors which drive the blurring motion compensation lens frame 6 by applying respective forces in the $B_X$ direction and $B_Y$ direction to the blurring motion compensation lens frame 6. The voice coil motors 440 and 441 have the same structure and differ only the direction in which they apply force to the blurring motion compensation lens frame 6. As shown in FIG. 4, the voice coil motor 440 includes a yoke 413, a permanent magnet 414 which forms a magnetic field with respect to yoke 413, a coil 412 located between yoke 413 and the permanent magnet 414, and a yoke 415 which locks the permanent magnet 414. When current flows in coil 412, the blurring motion compensation lens 5 is driven, receiving a thrust $R_Y$ in the downward direction along the $B_Y$ direction. When current flows in the opposite direction in the coil 412, the blurring motion compensation lens 5 is driven, receiving a thrust in the opposite direction (upward).

The position sensors 442 and 443 detect the position in the respective $B_Y$ direction and $B_X$ direction of the blurring motion compensation lens 5. The position sensors 442, 443 both have the same structure and position sensor 442 is further illustrated in FIG. 6.

FIG. 6 is a cross sectional diagram, sectioned along lines VI—VIA of FIG. 3. Drawing numbers of members in the cross sectional diagram sectioned on lines VI–VIB of FIG. 3 are shown in parentheses in FIG. 6.

The position sensor 442 includes a light emitting element 420 mounted on the frame member 408, a light receiving element 421 mounted on the base frame 407, a slit member 424 located between the light emitting element 420, a light receiving element 421, and a slit 424*a* formed in slit member 424. Light emitted from the light emitting element 420 passes through the slit 424*a* and reaches the light receiving element 421. When slit 424*a* moves, the position of the light which reaches the light receiving element 421 through slit 424*a* also moves. Because a change of the position of the light causes a change in the output signal of the light receiving element 421, the position of the blurring motion compensation lens 5 in the $B_Y$ direction can be detected based on the change in the output signal.

The steel ball insertion units 407*a*, 407*b* and 407*c* support steel balls 450, 455 and 460. The steel ball insertion units 407*a*, 407*b* and 407*c* are the same structure as shown in FIG. 4 and FIG. 5. However, only the steel ball insertion unit 407*a* will be described as shown in FIG. 5.

The steel ball insertion units 407*a*, 407*b* and 407*c* includes a steel ball 450, a retainer member 453 which houses this steel ball in a slightly exposed state, and a steel ball receiving member 452 disposed in the bottom of the retainer member 453.

The steel ball receiving member 452 comprises a metal of greater hardness than the ball 450. The steel ball receiving member 452 preferably forms a flat surface so as to make point contact with the ball 450.

Figure 7:
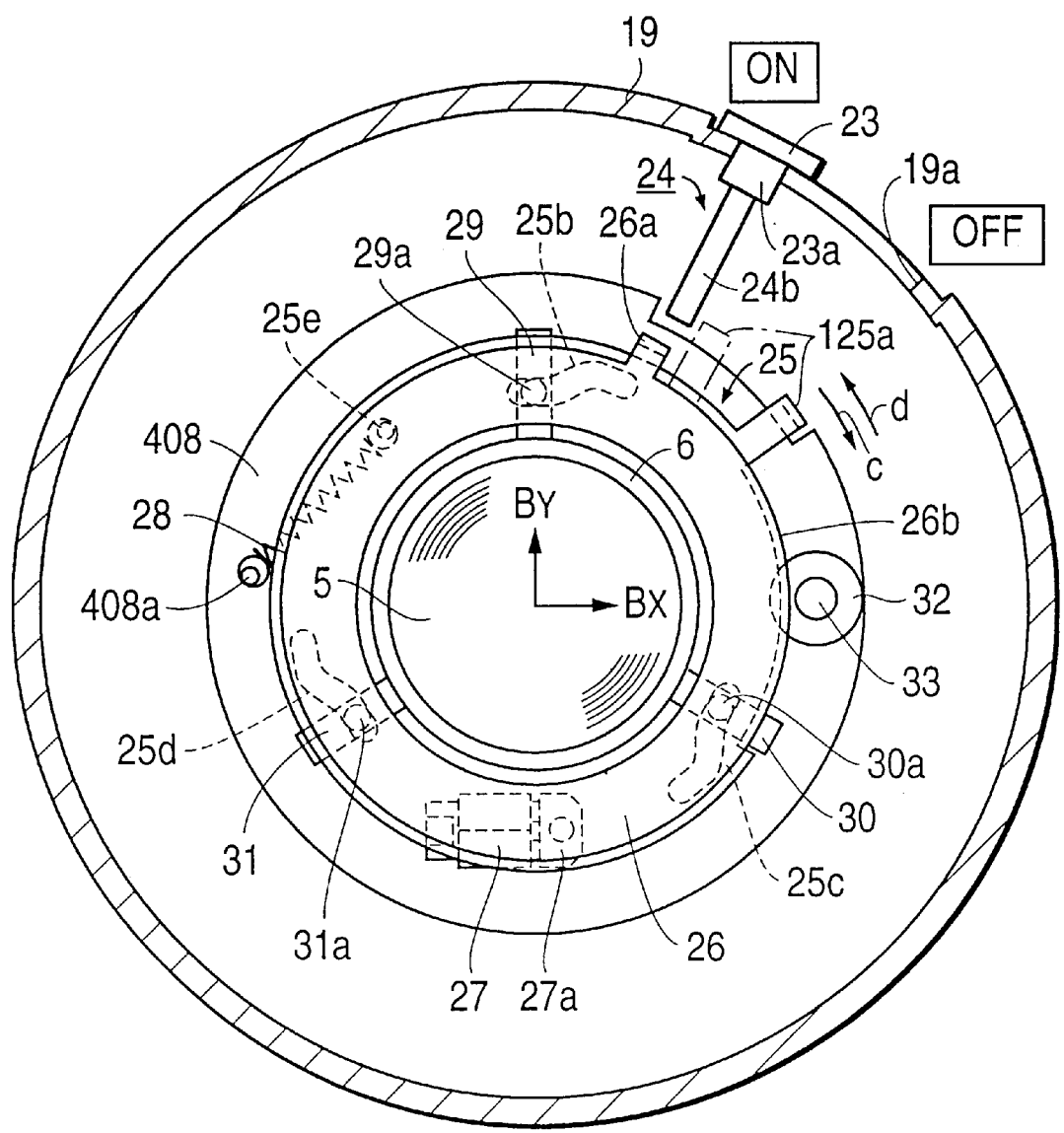
FIG. 7 is a schematic cross sectional diagram showing the lock mechanism of the motion compensation device according to a first preferred embodiment of the present invention.
Figure 8:
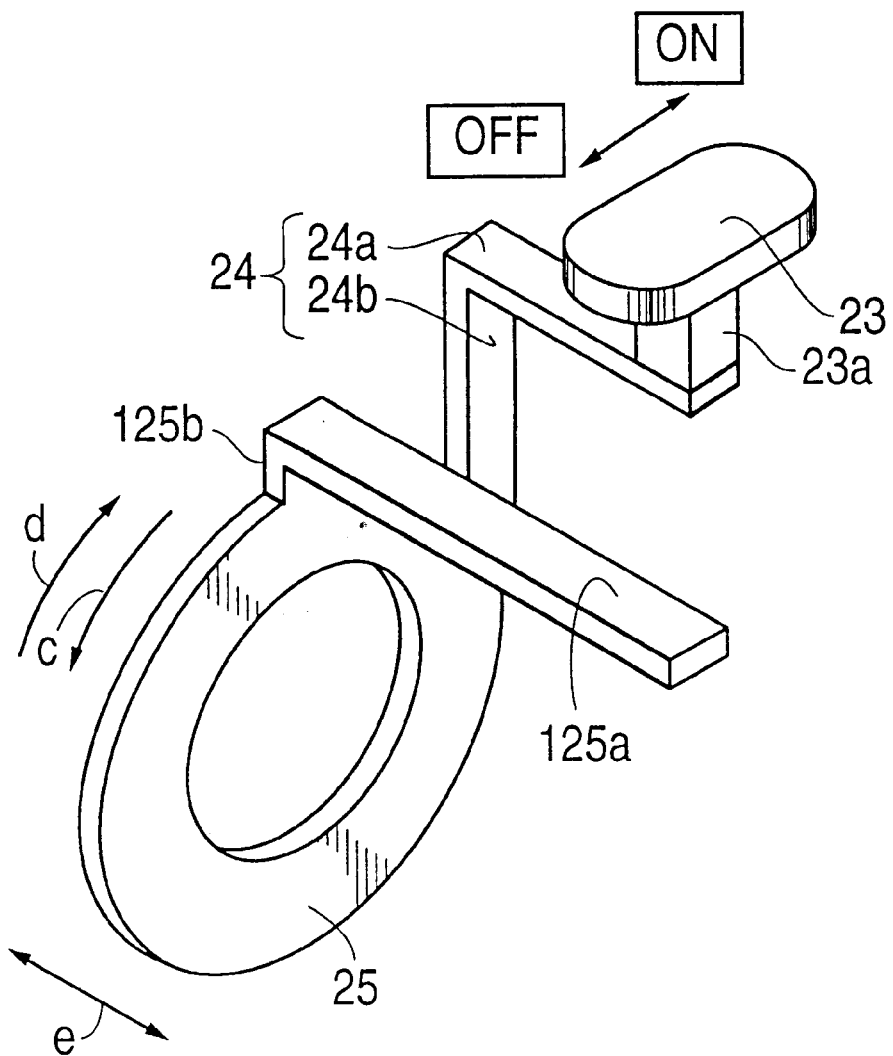
FIG. 8 is a schematic cross sectional diagram showing the operation mode changeover switch and the lock ring of the motion compensation device according to a first preferred embodiment of the present invention.

FIG. 7 is a cross sectional diagram showing a locking mechanism of blurring motion compensation device according to a first preferred embodiment of the present invention. FIG. 8 is an oblique diagram showing schematically the operation mode changeover switch and lock ring of the blurring motion compensation device according to a first preferred embodiment of the present invention.

The operation mode changeover switch 23 is a switch which changes the operation of the blurring motion compensation lens 5 into one of two operating modes. In a first preferred embodiment of the present invention, the operation mode changeover switch 23 can change between an ON position in which the blurring motion compensation operation is performed by the blurring motion compensation lens 5, and an OFF position in which the blurring motion compensation operation is not performed. The operation mode changeover switch 23, as shown in FIG. 1 and FIG. 7, is mounted to slide freely in the circumferential direction of the cover 19. A support unit 23*a* is formed in the operation mode changeover switch 23 which is movable between an ON position and an OFF position, and passes through a through hole 19*a* formed in the cover 19.

A contact member 24 couples to the operation mode changeover switch 23 and comes into contact with a coupling member 125. Contact member 24 causes locking, by a lock ring 25, of the coupling member 125 together with the blurring motion compensation lens 5. The contact member 24, as shown in FIG. 7 and FIG. 8, is an L-shaped member comprising a parallel portion 24*a* which extends parallel to the optical axis I, a contact unit 24*b* which is bent at a right angle from the parallel portion 24*a*, and contacts a coupling member 125*a*.

The lock ring 25 locks or unlocks the blurring motion compensation lens frame 6 which supports the blurring motion compensation lens 5, by rotating in direction c as shown in FIG. 7. Lock ring 25 includes a support member 125*b* of the coupling member 125*a* on its outer circumference. Pins 29*a*, 30*a* and 31*a* are mounted in lock members 29, 30 and 31 which are inserted into S-shaped cam units 25*b*, 25*c* and 25*d*. A spring suspension 25*e* is mounted to one end of a spring 28. Also, an iron piece 27*a* is mounted on the lock ring 25.

The lock members 29, 30 and 31 lock or unlock the blurring motion compensation lens frame 6. The lock members 29, 30 and 31, as shown in FIG. 4 and FIG. 7, are located at intervals of 120° to each other. The lock members 29, 30 and 31, by their end portions moving back and forth in the diametral direction of the blurring motion compensation lens frame 6, come into contact with the outer circumferential portion of the blurring motion compensation lens frame 6, and lock and unlock the blurring motion compensation lens frame 6. Pins 29a, 30a and 31a are mounted on the lock members 29, 30 and 31 and project at right angles therefrom.

The support member 125b locks the blurring motion compensation lens 5 by the lock ring 25 coupling to the operation mode changeover switch 23. This locking is unrelated to the movement position in the optical axis I direction of the blurring motion compensation lens frame 6 and the blurring motion compensation lens drive mechanism 4. The coupling member 125a, as shown in FIG. 1 and FIG. 8, extends parallel to the optical axis I. A support member 125b is bent perpendicularly at one end of the coupling member 125a. This support member 125b is mounted on the lock ring 25. The coupling member 125a, when the blurring motion compensation lens frame 6 and the blurring motion compensation mechanism 4 move in direction e in FIG. 8 due to a zooming operation, can make contact with the contact member 24.

The spring 28, as shown in FIG. 7, forces lock ring 25 to rotate in a counter-clockwise direction. This spring 28 has one end mounted on the spring suspension 25e of the lock ring 25 and the other end mounted on a spring suspension unit 408a which is disposed in the frame member 408.

A combination magnet 27 maintains a locked or unlocked state of the blurring motion compensation lens frame 6 by attracting or releasing the iron piece 27a mounted on the lock ring 25.

A charge ring 26 causes rotation of the lock ring 25 as far as the combination magnet 27 is able to attract the iron piece 27a of the lock ring 25 whose lock has been released. The charge ring 26 includes an engagement unit 26a which comes into contact with the support unit 126b of the lock ring 25, and a rack unit 26b which engages a gear 33 of the motor 32.

A discussion of the zooming operation and the focusing operation of the lens barrel fitted with a blurring motion compensation device according to a first preferred embodiment of the present invention will now be given.

As shown in FIG. 1, when the zoom ring 22 rotates around the optical axis I, the cam tube 15 with a projecting pin 15a engages with the engagement unit 22a of this zoom ring 22 and rotates with the zoom ring 22. When the cam tube 15 rotates around the optical axis I, the cam grooves 15b, 15c, 15d and 15e formed in this cam tube 15 respectively push the pins 10a, 16b, 4a and 11a which are fitted to move freely. The ends of the pins 10a, 16b, 4a and 11a fit, freely movable, into the rectilinear groove 14a of the inner lock tube 14. Because of this configuration, the first lens group movement tube 16, the third lens group movement frame 3, the aperture unit 12, the blurring motion compensation lens frame 6, the blurring motion compensation drive mechanism 4, the fifth lens group frame 11, in which these pins 10a, 16b, 4a and 11a are mounted, perform zooming by moving in the optical axis I direction, without rotating around the optical axis I. Helicoid ring 17, to which the first lens group movement frame 8 is mounted, moves in the optical axis I direction integrally with the first lens group movement tube 16 because the male helicoid screw portion 16a of the first lens group movement tube 16 engages with the female helicoid screw portion 17a of the helicoid ring 17. The coupling member 125a moves in the optical axis direction together with the blurring motion compensation lens frame 6 and the blurring motion compensation drive mechanism 4 and the contact unit 24b is capable of coming into contact with the rectilinear portion, extending in the optical axis I direction, of the coupling member 125a.

As shown in FIG. 1, when the range finder ring 21 rotates around the optical axis I, a pin 21a formed on this zoom ring 22 is in contact with the engagement unit 17c of the helicoid ring 17 and causes this helicoid ring 17 to rotate around the optical axis I. The female helicoid screw 17a of the helicoid ring 17 engages with the male helicoid screw portion 16a of the first lens group movement tube 16 and a pin 16b disposed on this first lens group movement tube 16 fits into a rectilinear groove 14a of the inner lock tube 14. Accordingly, the rotation of the first lens group movement tube 16 around the optical axis I is regulated and only movement in the direction of the optical axis I is permitted. As a result, the helicoid ring 17 rotates around the optical axis I while engaged with the male helicoid screw 16a of the first lens group movement tube 16 and on which the first lens group movement frame 8 is mounted, thereby focusing while moving in the direction of the optical axis I.

Concentrating on the operation of the CPU 137, the operation of the motion compensation device according to a first preferred embodiment of the present invention will be described.

Figure 9:
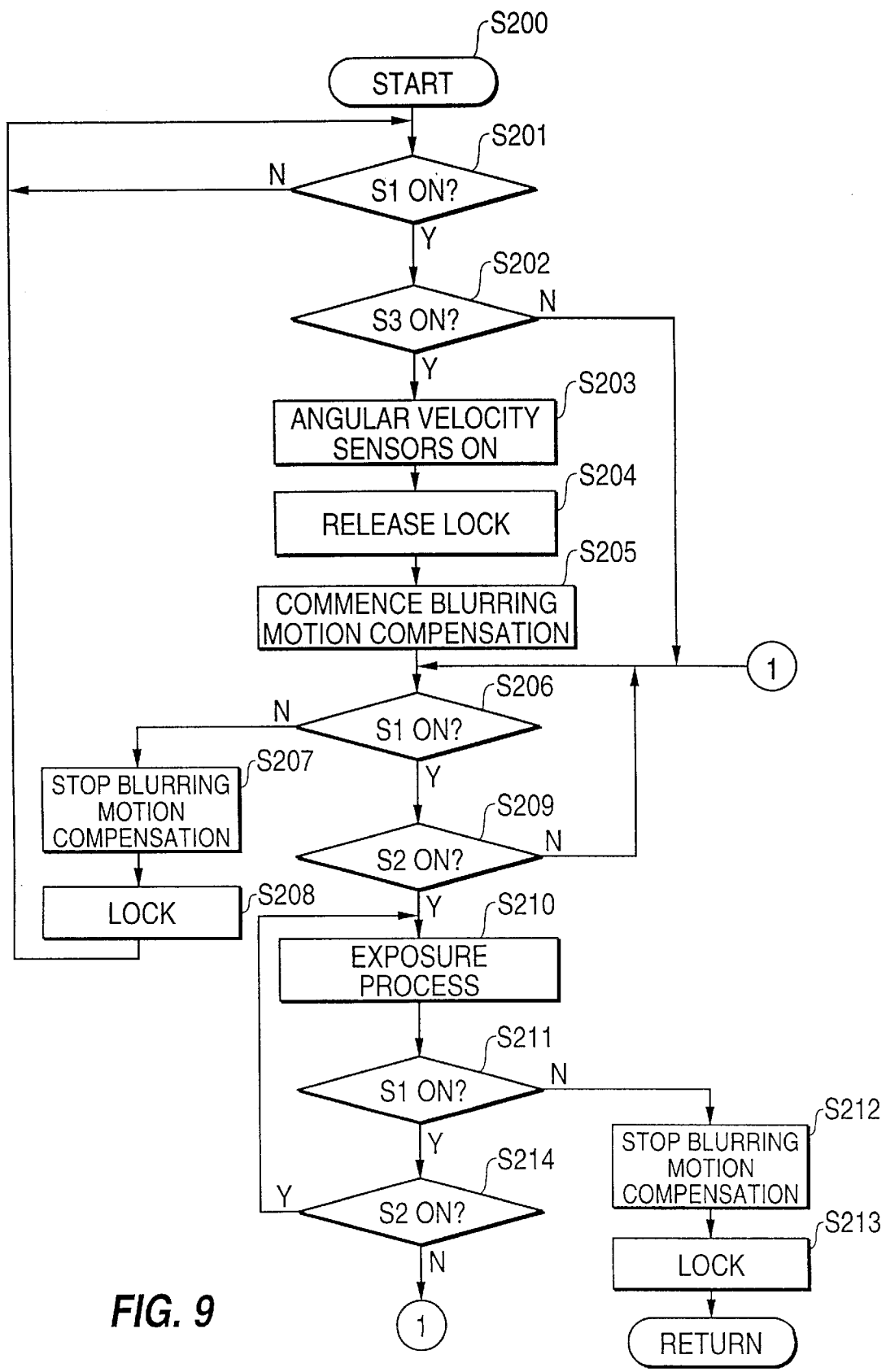
FIG. 9 is a flow chart which illustrates the operation of the motion compensation device according to a first preferred embodiment of the present invention.

FIG. 9 is a flow chart which illustrates the operation of the motion compensation device according to a first preferred embodiment of the present invention.

In step ("S" hereinafter) 200, when the main switch MS of the camera body 101 is set ON, electric power from power supply battery 146 is supplied to the CPU 145. Further, in the following description, with the exception of particularly noted cases, each step is performed by the CPU 137.

In S201, the CPU 145 determines whether the half depression switch S1 is ON. If the half depression switch S1 is ON, the routine proceeds to S202. If it is not ON, the CPU 145 continues to repeat the decision until the half depression switch S1 is ON.

In S202, the CPU 137 determines whether the changeover switch S3 is ON. If the changeover switch S3 is on, the CPU 137 proceeds to S203. If the changeover switch S3 is off, CPU 137 proceeds to S206.

In S203, the CPU 137 sets the angular velocity sensors 131 and 134 ON. The CPU 137, based on the information from CPU 145 indicating that half depression switch S1 is ON, instructs angular velocity sensors 131 and 134 to output blurring motion detection information. The angular velocity sensors 131 and 134 detect blurring motion of the camera body 101 and the lens barrel 102 and proceed to output the blurring motion detection information.

In S204, the CPU 137 instructs unlocking of the blurring motion compensation lens 5. When the CPU 137 places the combination magnet 27 in an electrically conducting state, the combination magnet 27 releases the iron piece 27a. As a result, the lock ring 25 due to the force exerted by spring 28, rotates counter-clockwise and pins 29a, 30a and 31a are guided by the S-shaped cam units 25b, 25c and 25d. As a result, the lock members 29, 30 and 31 separate from the outer circumference of the blurring motion compensation lens frame 6, and the lock on the blurring motion compensation lens frame 6 is released.

In S205, the CPU 137 instructs the voice coil motors 440 and 441 to commence blurring motion compensation. The CPU 137 calculates the amount of blurring motion compensation, based on the blurring motion detection information from the angular velocity sensors 131 and 134. The CPU 137 calculates the drive amount of the blurring motion compensation lens 5, based on the calculated amount of blurring motion compensation, and outputs a blurring motion compensation commencement signal to the voice coil motors 440 and 441. As a result, the blurring motion compensation lens 5, driven by a predetermined amount by the voice coil motors 440 and 441, commences blurring motion compensation.

As shown in FIG. 3, when the blurring motion compensation lens frame 6 receives a downward thrust $P_Y$ along the $B_Y$ direction by the voice coil motor 440, the blurring motion compensation lens frame 6 slides to the right and downward on the guide shaft 409 due to this thrust $P_Y$. A guide arm 410, as shown in FIG. 5, rotates clockwise, with the shaft 411 as its center due to the thrust $P_Y$. As a result, the guide shaft 409, by the rotation of the guide arm 410, moves parallel to the direction B in FIG. 3. The hooks 6d and 6e, as shown in FIG. 5, are movable in the optical axis I direction, and engage with the guide shaft 409. The guide shaft 409, by the rotation of the guide arm 410, also moves in the optical axis I direction relative to the hooks 6d and 6e. However, because the blurring motion compensation lens frame 6 is forced by three springs 464, 465 and 466 to come into contact with the steel balls 450, 455 and 460, movement is regulated in the direction of the optical axis I.

On the other hand, as shown in FIG. 3, when the blurring motion compensation lens frame 6 receives a thrust $P_X$ in the left-hand direction along the $B_X$ direction by the voice coil motor 441, the blurring motion compensation lens frame 6 slides leftward and upward on the guide shaft 409 due to this thrust $P_X$. Moreover, the guide shaft 409 is caused to move parallel to the direction B in FIG. 3. The blurring motion compensation lens frame 6, because the hook units 6d and 6e are engaged with the guide shaft 409, rotation around the optical axis I is regulated and it can move to an optional position in a plane perpendicular to the optical axis I.

Further, the preferred embodiment of the present invention permits viewing of blurring motion compensation to be observed in a viewfinder (not shown in the drawing).

In S206, the CPU 145 determines the state of half depression switch S1. When the half depression switch S1 is OFF, the routine proceeds to S207. When the half depression switch remains ON, it proceeds to S209.

In S207, the CPU 137 instructs the voice coil motors 440 and 441 to stop blurring motion compensation. The CPU 137, based on information from the CPU 145 indicating that the half depression switch S1 is OFF, outputs a blurring motion compensation stop signal to the voice coil motors 440 and 441, thereby causing voice coil motors 440 and 441 to stop the blurring motion compensation lens 5.

In S208, the CPU 137 instructs the locking of the blurring motion compensation lens 5. As shown in FIG. 7, when the CPU 137 instructs the motor 32 to rotate, the charge ring 26 is caused to rotate in a clockwise direction using gear 33 of motor 32. When the charge ring 26 rotates, the engagement unit 26a of the charge ring 26 presses in a clockwise direction on the support member 125b, which is in line with lock ring 25. The charge ring 26 then rotates with combination magnet 27 which attracts the iron piece 27a of the lock ring 25. The combination magnet 27, as shown in FIG. 7, attracts the iron piece 27a, and the front ends of the lock members 29, 30 and 31 which are in contact with the outer circumference of the blurring motion compensation lens frame 6. As a result, the blurring motion compensation lens frame 6 is locked in position by lock members 29, 30 and 31. Returning to S201, the CPU 145 determines whether the half depression switch S1 is ON.

In S209, CPU 145 determines whether the full depression switch S2 is ON. When the half depression switch S1 is still ON and the full depression switch S2 is ON, the routine proceeds to S210. When the full depression switch S2 is OFF, processing returns to S206 and the CPU 145 repeats the determination of whether the half depression switch S1 is ON.

In S210, the CPU 145 proceeds to the exposure process. The CPU 145 instructs driving of the shutter mechanism (not shown in the drawing), and the shutter mechanism unit opens and closes the shutter to adjust the photographic exposure. Further, the CPU 137 can perform blurring motion compensation during the exposure by driving the blurring motion compensation lens 5 by the output of the blurring motion detection information from the angular velocity sensors 131 and 134 and by driving voice coil motors 440 and 441.

In S211, the CPU 145 determines whether the half depression switch S1 has remained ON. When the half depression switch S1 is OFF, execution proceeds to S212. When the half depression switch S1 remains ON, execution proceeds to S214.

In S212, the CPU 137 instructs the voice coil motors 440 and 441 to stop blurring motion compensation. The CPU 137, based on the information from the CPU 145 indicating that the half depression switch S1 is OFF, outputs a blurring motion compensation stop signal to the voice coil motors 440 and 441. The voice coil motors 440 and 441 then stop the blurring motion compensation lens 5.

In S208, the CPU 137 causes the locking of the blurring motion compensation lens 5. The CPU 137 instructs the motor 32 to rotate, the lock ring 25 rotates by the charge ring 26, the combination magnet 27 attracts the iron piece 27a of the lock ring 25. The blurring motion compensation lens frame 6 is then locked by the lock members 29, 30 and 31, and the execution of operations ends.

In S214, the CPU 145 determines whether the full depression switch S2 is ON. When the half depression switch S1 and the full depression switch S2 are both ON, the routine returns to S210. In S210, the CPU 145 instructs the shutter mechanism unit (not shown in the drawing) to start the exposure process, and photographs are then taken. When the full depression switch S2 is OFF, processing then proceeds to S206 where it is determined whether the half depression switch S1 is ON.

A description will now be given of the blurring motion compensation lens frame lock and unlock functions of the operation mode changeover switch of the motion compensation device according to the first preferred embodiment of the present invention.

Lock Operation

As shown in FIG. 7, when the operation mode changeover switch 23 moves from the ON position to the OFF position, the contact unit 24b of changeover switch 23 contacts the coupling member 125a of the lock ring 25. The contact unit 24b, by pressing on the coupling member 125a, causes rotation of the lock ring 25 in the direction c shown in FIG. 7. Pins 29a, 30a and 31a of the lock members 29, 30 and 31 are then guided by the S-shaped cam units 25b, 25c and 25d of the lock ring 25. Lock members 29, 30 and 31 thereby move in the diametral direction of the blurring motion compensation lens frame 6 and contact the blurring motion compensation lens frame 6. Because the contact unit 24b of the operation mode changeover switch 23 locks the coupling member 125a in the OFF position, the blurring motion compensation lens frame 6 is maintained in the locked position by the lock ring 25.

Unlock Operation

When the operation mode changeover switch 23 moves from the OFF position to the ON position, the lock ring 25 rotates in the direction d as shown in FIG. 7 due to the force exerted by spring 28. Pins 29a, 30a and 31a are guided by the S-shaped cam units 25b, 25c and 25d, and the front ends of the lock members 29, 30 and 31 separate from the outer circumference of the blurring motion compensation lens frame 6. As a result, the lock of the blurring motion compensation lens frame 6 is released.

In the first preferred embodiment of the present invention, when the operation mode changeover switch 23 moves from the ON position to the OFF position, the contact unit 24b the operation mode changeover switch 23 contacts the coupling member 125a of the lock ring 25. The lock ring 25 rotates while pressed by the contact unit 24b and the outer circumferential portion of the blurring motion compensation lens frame 6 is locked by the lock members 29, 30 and 31. Accordingly, the operation mode changeover switch 23 which couples to the coupling member 125a is in contact with the contact unit 24b, and the blurring motion compensation lens frame 6 can be maintained in a locked state by the lock ring 25. Moreover, by supporting the coupling member 125a in contact with the contact unit 24b, the unlocking of the blurring motion compensation lens frame 6 can be reliably prevented.

In the first preferred embodiment of the present invention, when lens barrel 102 is installed on a type of camera which cannot supply electric power to the lens barrel 102, blurring motion compensation cannot be performed. In the first preferred embodiment of the present invention, moving the operation mode changeover switch 23 from the ON position to the OFF position can lock the blurring motion compensation lens frame 6 by the lock ring 25. Thereby, the blurring motion compensation lens frame 6 can be reliably locked even without a power supply. Moreover, in a lens barrel which locks the blurring motion compensation lens frame by electric power, when removed from the camera body in the unlocked state, the blurring motion compensation lens frame cannot be locked without electric power. In this kind of lens barrel, in a camera body which cannot supply electric power to the lens barrel, when installed in a state in which the blurring motion compensation lens frame is not locked, there is a possibility of the lens being damaged. In the lens barrel 102 in the first preferred embodiment of the present invention, when installed on a camera body which cannot perform blurring motion compensation, the operation mode changeover switch 23 can be slid to the OFF position. As a result, the blurring motion compensation lens frame 6 can be locked without any special operations being necessary.

In the first preferred embodiment of the present invention, the CPU 137 driving the motor 32 and charge ring 26, the blurring motion compensation lens frame 6 can be locked by the lock ring 25. In the first preferred embodiment of the present invention, the CPU 137, unrelated to whether the motor 32 and charge ring 26 are drive controlled, coupled with the operation mode changeover switch 23, can maintain the blurring motion compensation lens frame 6 in a locked state by the lock ring 25. Accordingly, in the first preferred embodiment of the present invention, no electric power supply battery 146 is necessary for locking or unlocking the blurring motion compensation lens frame 6. Using the operation mode changeover switch 23, the blurring motion compensation lens frame 6 can be locked or unlocked.

Moreover, even if the voltage of the electric power supply battery 146 necessary for driving the motor 32 is low, the blurring motion compensation lens frame 6 can be locked by the operation mode changeover switch 23.

In a motion compensation device according to the first preferred embodiment of the present invention, removing the power supply battery 146 from the camera body 101 with the blurring motion compensation lens frame 6 unlocked, or even when the lens barrel 102 is removed, changing over the operation mode changeover switch 23 to the OFF position and thereby locking the blurring motion compensation lens frame 6 is still possible. Also, in the state in which the operation mode changeover switch 23 was placed in the ON position, even if the iron piece 27a is separated from the combination magnet 27 by some kind of impact, it is possible to lock the blurring motion compensation lens frame 6 by placing the operation mode changeover switch 23 in the OFF position.

In the first preferred embodiment of the present invention, the blurring motion compensation lens 5 is driven by the voice coil motors 440 and 441 and the CPU 137. In this embodiment, unrelated to whether the blurring motion compensation lens 5 performs blurring motion compensation, the blurring motion compensation lens frame 6 can be maintained in the locked state by the lock ring 25. Moreover, in the first preferred embodiment of the present invention, the coupling member 125a of the lock ring 25 is a member which extends parallel to the optical axis I. Even if the blurring motion compensation lens frame 6 and the blurring motion compensation lens drive mechanism 4 move in the optical axis I direction due to a zooming operation, coupling member 125a can make contact with contact unit 24b of the operation mode changeover switch 23. Because of this, coupling with the operation mode changeover switch 23 and locking the blurring motion compensation lens frame 6 is possible, unrelated to the position of the blurring motion compensation lens frame 6 and the blurring motion compensation drive mechanism 4.

Second Preferred Embodiment

A detailed description is given below, with reference to the drawings, of a second preferred embodiment of the present invention.

Further, in the following description, members which are the same as members which have been described in the first preferred embodiment are given the same symbols, and detailed description of these portions is omitted.

Figure 10:
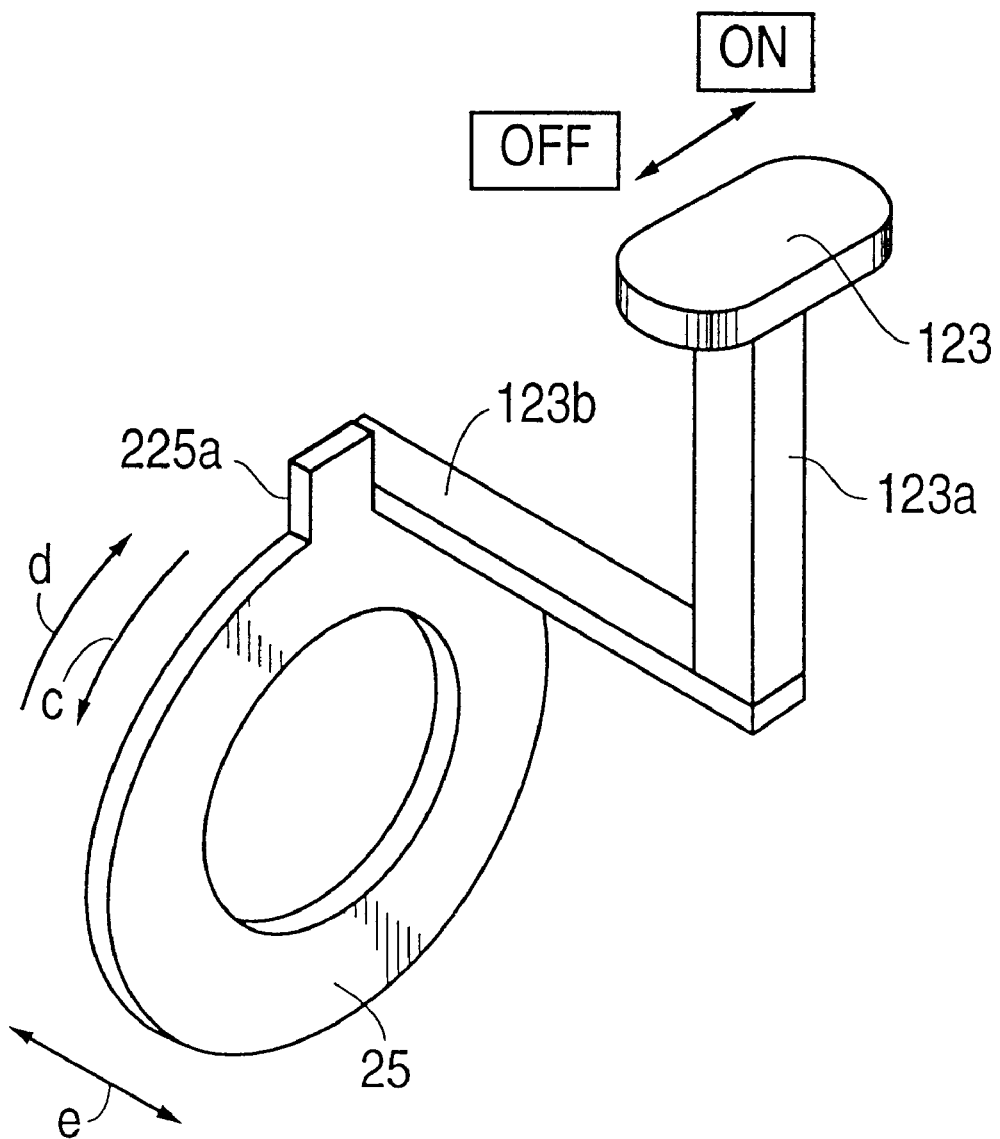
FIG. 10 is an oblique diagram schematically showing the operation mode changeover switch and the lock ring of the blurring motion compensation device according to a second preferred embodiment of the present invention.

FIG. 10 is an oblique diagram showing schematically the operation mode changeover switch and lock ring of a motion compensation device according to the second preferred embodiment of the present invention.

In the second preferred embodiment of the present invention, the coupling member 123b extends parallel to the optical axis I and contacts support unit 123a of the operation mode changeover switch 123. Coupling member 123b also contacts a contact unit 225a having a convex shape disposed in the lock ring 25. When the operation mode changeover switch 123 moves from the ON position to the OFF position, the coupling member 123b contacts the contact unit 225a formed in the outer circumference of the lock ring 25, and causes this lock ring 25 to rotate in the direction c in FIG. 10. The lock ring 25 moves in the optical axis I direction (direction e in FIG. 10) due to zooming, but the coupling member 123b and the contact unit 125c can still make contact regardless of the position of the lock ring 25.

Third Preferred Embodiment

Figure 11:
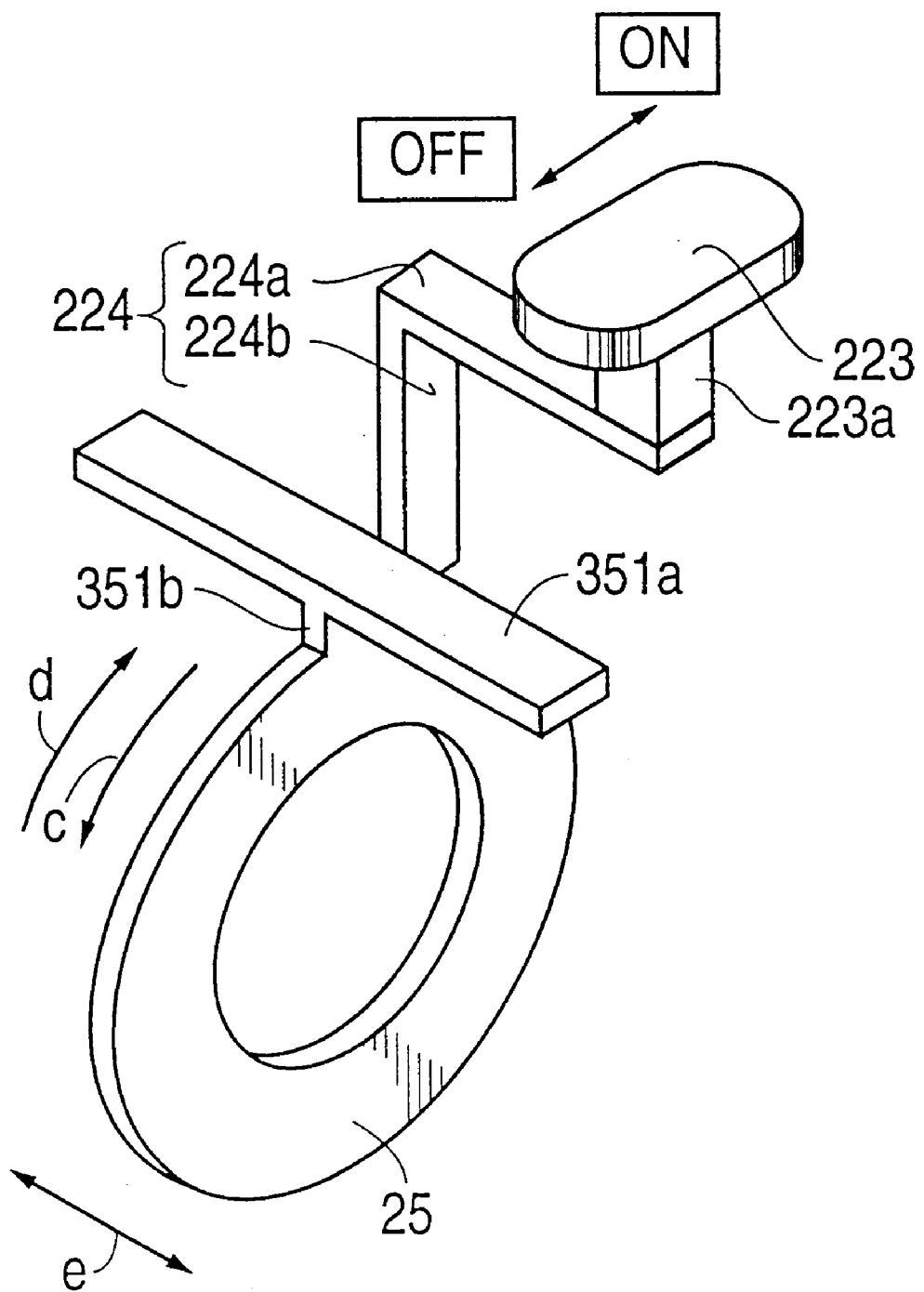
FIG. 11 is an oblique diagram schematically showing the operation mode changeover switch and the lock ring of the motion compensation device according to a third preferred embodiment of the present invention.

FIG. 11 is an oblique diagram which schematically shows the operation mode changeover switch and lock ring of a motion compensation device according to a third preferred embodiment of the present invention.

In this third preferred embodiment of the present invention, a coupling member 351a is formed with free ends in the optical axis I direction and support unit 351b formed in the lock ring 25 supports the intermediate portion of the coupling member 351a.

In the third preferred embodiment of the present invention, the contact unit 24b contacts the coupling member 351a in the support unit 351b. Because of this configuration, the support unit 223a can prevent torsional stress arising in the contact member 224 and the coupling member 351a. Moreover, because contact unit 224b contacts the coupling unit 351a at the support unit 351b, it can easily rotate the lock ring 25, and can also easily cause the operation mode changeover switch 23 to slide.

Fourth Preferred Embodiment

Figure 12:
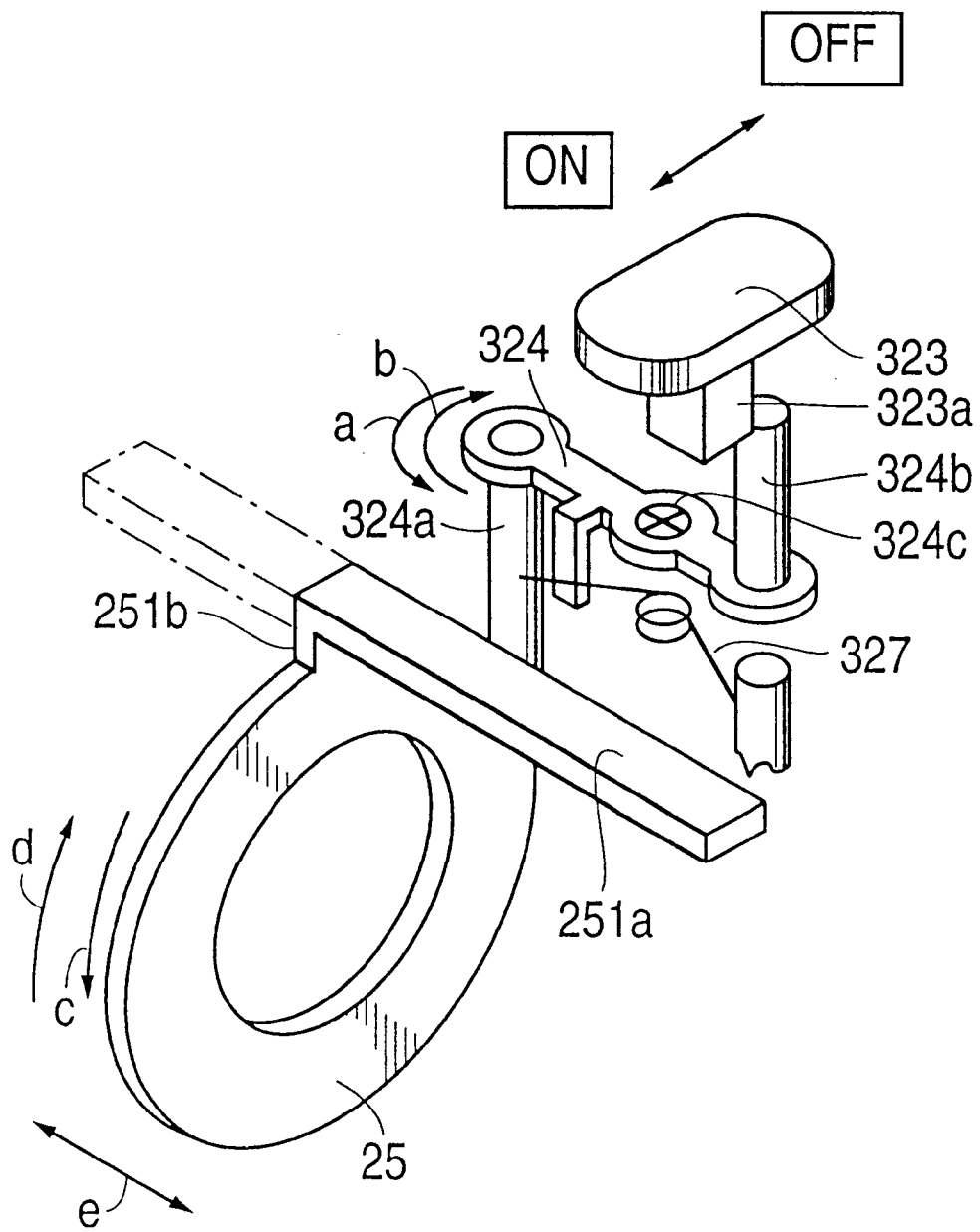
FIG. 12 is an oblique diagram schematically showing the operation mode changeover switch and the lock ring of the motion compensation device according to a fourth preferred embodiment of the present invention.

FIG. 12 is an oblique diagram which schematically shows the operation mode changeover switch and lock ring of a blurring motion compensation device according to a fourth preferred embodiment of the present invention.

A lever 324 rotates and couples to an operation mode changeover switch 323, in order to lock the blurring motion compensation lens frame 6 which in turn causes the lock ring 25 to rotate. On the lever 324, projecting toward an engagement unit 323a disposed on the operation mode changeover switch 323, an engagement shaft 324b contacts engagement unit 323a and a support shaft 324c. Support shaft 324c which supports, with free rotation, lever 324, and the contact shaft 324a which contacts this coupling member 251a. The lever 324 is urged by a spring 327 in the direction contacting the engagement shaft 324b and support unit 323a.

A description will next be given of locking and unlocking the blurring motion compensation lens frame by the operation mode changeover switch of the blurring motion compensation device according to the fourth preferred embodiment of the present invention.

Locking Operation

When the operation mode changeover switch 323 moves from the ON position to the OFF position, the engagement unit 323a of the operation mode changeover switch 323 pushes the engagement shaft 324b. The lever 324, resisting the force exerted by the spring 327, rotates in the direction a in FIG. 12 around the shaft 324c. The contact shaft 324a of the lever 324, presses against the coupling member 251a of the lock ring 25 and rotates the lock ring 25 in the direction c in FIG. 12. As a result, the blurring motion compensation lens frame 6 is maintained in a locked state by the lock ring 25.

Unlocking Operation

When the operation mode changeover switch 323 moves from the OFF position to the ON position, the lever 324 rotates in the direction b in FIG. 12 around the support shaft 324c, due to the force exerted by the spring 327. As a result, the lock ring 25 rotates in the direction d in FIG. 12 due to the force exerted by the spring 28, which is shown in FIG. 7, and the blurring motion compensation lens frame 6 is unlocked.

In the fourth preferred embodiment of the present invention, the actuation direction of the operation mode changeover switch 323 can be in the reverse direction to the actuation direction of the operation mode changeover switch 23 in the first through third preferred embodiments. Moreover, the amount of actuation necessary for the operation mode changeover switch 323 can be changed by changing the length of the lever 324.

Fifth Preferred Embodiment

A detailed description is given hereinafter of a fifth preferred embodiment of the present invention.

Figure 13:
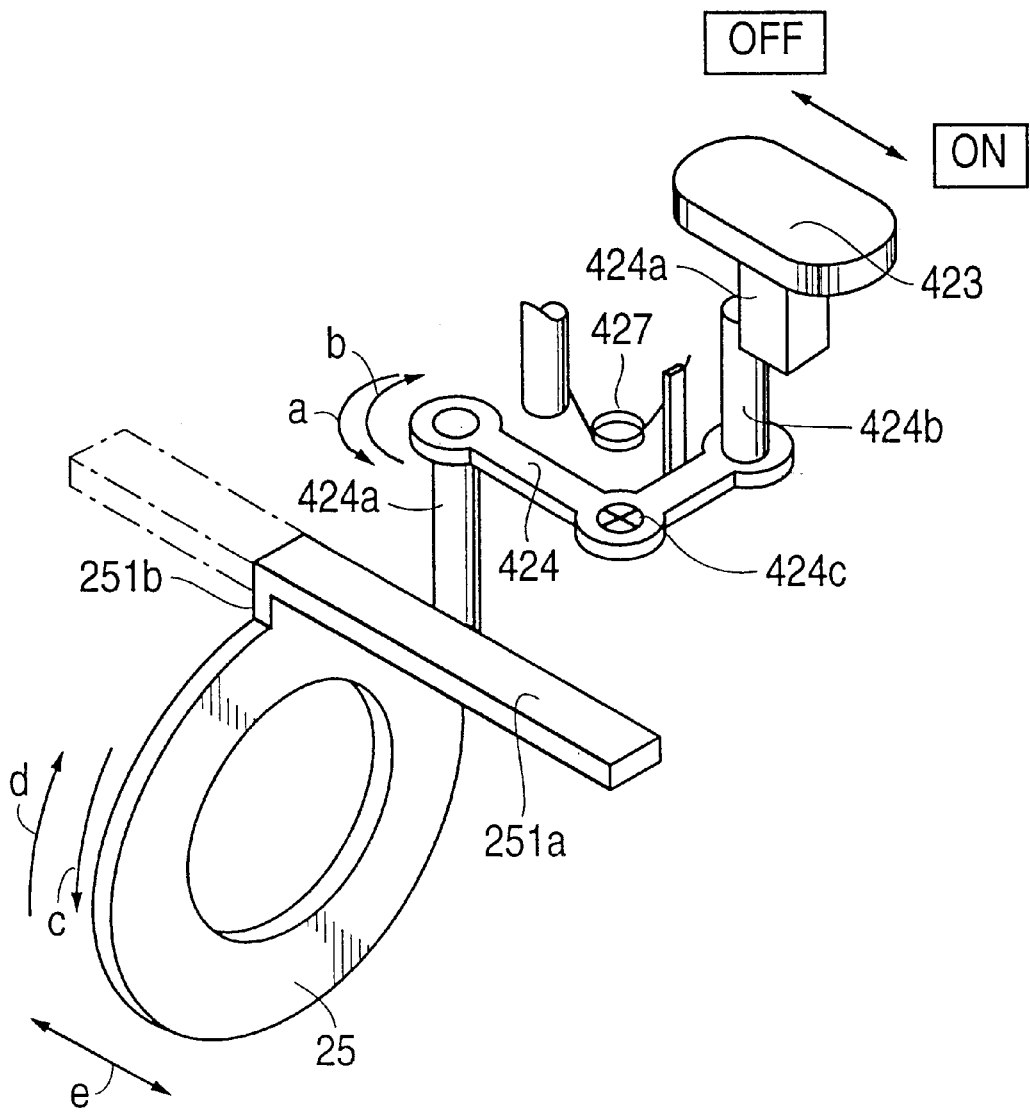
FIG. 13 is an oblique diagram schematically showing the operation mode changeover switch and the lock ring of the motion compensation device according to a fifth preferred embodiment of the present invention.

FIG. 13 is an oblique diagram which schematically shows the operation mode changeover switch and lock ring of a blurring motion compensation device according to a fifth preferred embodiment of the present invention.

In the fifth preferred embodiment of the present invention, a lever 424 is bent in a right angle forming an L-shape. An engagement unit 423a is coupled to the operation mode changeover switch 323 and when switching from ON to OFF, pushes an engagement shaft 424b and the lever 424 which rotate in the direction a in FIG. 13 around the support shaft 424c. A contact shaft 424a of the lever 424, pushing the coupling member 251a of the lock ring 25, rotates the lock ring 25 in the direction c in FIG. 13 and thereby the blurring motion compensation lens frame 6 is maintained in the locked state by the lock ring 25. On the other hand, when the operation mode changeover switch 423 is moved from the OFF position to the ON position, the lever 424 rotates in the direction b in FIG. 13 due to the force exerted by the spring 427. The lock ring 25 then rotates in the direction d in the Figure, and the blurring motion compensation lens frame 6 is unlocked.

In the fifth preferred embodiment of the present invention, the direction of actuation of the operation mode changeover switch 423 can be in a direction parallel to the optical axis I. Moreover, the amount of actuation of the operation mode changeover switch 423 can be changed by adjusting the length of the lever 424.

Other Embodiments

Without limitation to the above-described embodiments, various modifications or changes are possible, and these also are within the scope of the present invention.

For example, coupled to the changeover operation of the operation mode changeover switches 23, 123, 223, 323 and 423, the lock state of the blurring motion compensation lens frame 6 is maintained. However, a dedicated lock member may be disposed instead of using the operation mode changeover switches 23, 123, 223, 323 and 423. In this manner, coupling to the changeover operation of this lock member, the lock state of the blurring motion compensation lens frame 6 can be maintained. Moreover, the length of the coupling member 125a and the diameter of the lock ring 25 can be adjusted. When both lengths are equally disposed, the operation mode changeover switches 23, 123, 223, 323 and 423 can rotate the lock ring 25 with good efficiency.

In the third preferred embodiment of the present invention, the coupling member 351 is disposed toward the lock ring 25. However, the central portion of the coupling member 351a may be mounted toward the contact unit 224b of the contact member 224. Moreover, in the fourth and fifth embodiments of the present invention, the coupling member 251a is cantilever supported by the support member 251b of the lock ring 25. However, as shown in FIG. 12 and FIG. 13, it may have free end portions in the optical axis I direction. Further, in the above preferred embodiments of the present invention, the voice coil motor 441 is designed to exert a force in the left-hand direction along the axial direction $B_X$. However, motor 441 can be caused to exert a force in the right-hand direction along the axial direction $B_X$. The voice coil motors 440 and 441 can also be both driven at the same time.

The above embodiments of the present invention are also described as relating to a camera. However, embodiments of the present invention are not intended to be limited to a camera. For example, the present invention can be used in devices including, but not limited to, camcorders, motion picture camera, telescopes, binoculars, microscopes, range finding equipment, lasers, fiber optic communications systems, various optical projection systems and CD mastering systems.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A motion compensation device, suitable for an optical system, comprising:

a blurring motion compensation unit to compensate for blurring motion by driving a blurring motion compensation optical system in a direction orthogonal to the optical axis to correct blurring; and a locking actuation member, operating entirely mechanically by sliding along a lens barrel, to cause locking and unlocking of said blurring motion compensation optical system without requiring a power supply or electricity.

2. A motion compensation device as recited in claim 1, further comprising:

a movement unit to move said blurring motion compensation optical system in the optical axis direction; and said locking actuation member causes locking of said blurring motion compensation optical system independent of a movement position of said blurring motion compensation optical system.

3. A motion compensation device as recited in claim 1, wherein said locking actuation member further comprises:

a blurring motion compensation operation changeover member to change over the operation of said blurring motion compensation unit among a plurality of operating modes comprising locking, unlocking and engaging the blurring motion of compensation unit; and a coupling unit to couple said blurring motion compensation operation changeover unit and to cause locking of said blurring motion compensation optical system.

4. A motion compensation device as recited in claim 3, wherein said coupling unit further comprises:

a coupling member extending in the direction of motion of said blurring motion compensation optical system and disposed in said blurring motion compensation optical system or in said blurring motion compensation operation changeover member; and a contact member to come into contact with a linkage member, disposed in said blurring motion compensation operation changeover member or in said blurring motion compensation optical system;

said coupling member or said contact member locking said blurring motion compensation optical system, switching said blurring motion compensation operation changeover member to the changeover operation in said specific operation mode, and making contact with said contact member or said coupling member.

5. A motion compensation device as recited in claim 4, wherein said coupling unit further comprises:

a moving member;

a support member supported by said blurring motion compensation optical system or by said operation changeover member; and said contact member, being in said support member, comes into contact with said moving member.

6. A motion compensation device, suitable for an optical system, comprising:

a blurring motion compensation unit to compensate for blurring motion by driving a blurring motion compensation optical system in a direction orthogonal to the optical axis;

a locking member to lock and unlock said blurring motion compensation optical system; and a locking actuation member to cause locking and unlocking of said blurring motion compensation optical system by use of said locking member independent of the operation of said blurring motion compensation optical system, wherein said locking member and said locking actuation member operate entirely mechanically by sliding along a lens barrel without the use of a power supply or electricity by a sliding movement.

7. A motion compensation device as recited 6, further comprising:

a movement unit to move said blurring motion compensation optical system in the optical axis direction; and said locking actuation member causes locking of said blurring motion compensation optical system by using said locking member independent of a movement position of said blurring motion compensation optical system.

8. A motion compensation device as recited in claim 6, wherein said locking actuation member further comprises:

a blurring motion compensation operation changeover member to change over the operation of said blurring motion compensation unit between a plurality of operating modes comprising locking, unlocking and engaging the blurring motion of compensation unit; and a coupling unit to couple said blurring motion compensation operation changeover member and to cause locking of said blurring motion compensation optical system by use of said locking member.

9. A motion compensation device as recited in claim 8, wherein said coupling unit further comprises:

a coupling member extending in the direction of motion of said blurring motion compensation optical system and disposed in said blurring motion compensation optical system or in said blurring motion compensation operation changeover member; and a contact member which comes into contact with said coupling member and disposed in the blurring motion compensation operation changeover member or in the blurring motion compensation optical system;

said coupling member or said contact member locking said blurring motion compensation optical system by use of said locking member and switching said blurring motion compensation operation changeover member to the changeover operation in a specific operation mode.

10. A motion compensation device as recited in claim 9, wherein said coupling unit further comprises:

a moving member;

a support member supported by said blurring motion compensation optical system or by said operation changeover member; and said contact member, being in said support member, comes into contact with said moving member.

11. A motion compensation device, suitable for an optical system, comprising:

a blurring motion compensation unit to compensate for blurring motion by driving a blurring motion compensation optical system in a direction orthogonal to the optical axis; and a locking member to lock and unlock said blurring motion compensation optical system;

a control unit to control the operation of said locking member; and a locking actuation member to cause locking and unlocking of said blurring motion compensation optical system by using said locking member, independent of the control operation of said control unit, wherein the locking member and the locking actuation member operate entirely mechanically without the use of a power supply or electricity by sliding along a lens barrel.

12. A motion compensation device as recited in claim 11, further comprising:

a movement device to move said blurring motion compensation optical system in the optical axis direction;

said locking actuation member to cause the locking of said blurring motion compensation optical system using said locking member, independent of the movement position of said blurring motion compensation optical system.

13. A motion compensation device as recited in claim 11, wherein said locking actuation member further comprises:

a blurring motion compensation operation changeover member to change over the operation of said blurring motion compensation unit among a plurality of operating modes comprising locking, unlocking and engaging the blurring motion of compensation unit; and a coupling unit coupled to said blurring motion compensation operation changeover member and causes locking of said blurring motion compensation optical system by use of said locking member, independent of the control operation of said control unit.

14. A motion compensation device as recited in claim 13, wherein said coupling unit further comprises:

a coupling member extending in the direction of motion of said blurring motion compensation optical system and disposed in said blurring motion compensation optical system or in said blurring motion compensation operation changeover member;

a contact member to come into contact with said coupling member, disposed in the blurring motion compensation operation changeover member or in the blurring motion compensation optical system;

said coupling member or said contact member locking said blurring motion compensation optical system by use of said locking member and switching said blurring motion compensation operation changeover member to the changeover operation in a specific operation mode.

15. A motion compensation device as recited in claim 14, wherein said coupling unit further comprises:

a moving member;

a support member supported by said blurring motion compensation optical system or by said operation changeover member; and said contact member, being in said support member, comes into contact with said moving member.

16. A method of motion compensation, comprising the steps of:

compensating for blurring motion by driving a blurring motion compensation optical system in a direction orthogonally to the optical axis; and locking said unlocking said blurring motion compensation optical system without requiring a power supply or the use of electricity through the use of an entirely mechanical mechanism by sliding along a lens barrel.

17. A method of motion compensation as recited in claim 16, further comprising the steps of:

moving said blurring motion compensation optical system in the optical axis direction; and locking said blurring motion compensation optical system independent of a movement position of said blurring motion compensation optical system.

18. A method of motion compensation as recited in claim 16, wherein said locking step further comprising the steps of:

changing over the operation of said blurring motion compensation optical system among a plurality of operating modes;

switching said changeover operation to a specific operating mode modes comprising locking, unlocking and engaging the blurring motion of compensation unit; and locking said blurring motion compensation optical system.

19. A method of motion compensation, comprising the steps of:

compensating for blurring motion by driving a blurring motion compensation optical system in a direction orthogonally to the optical axis; and locking and unlocking said blurring motion compensation optical system independent of the operation of said blurring motion compensation optical system using an entirely mechanical sliding mechanism without the use of a power supply or electricity.

20. A method of motion compensation as recited in claim 19, further comprising the steps of:

moving said blurring motion compensation optical system in the optical axis direction; and locking said blurring motion compensation optical system independent of a movement position of said blurring motion compensation optical system.

21. A method of motion compensation as recited in claim 19, wherein said locking step further comprising the steps of:

changing over the operation of said blurring motion compensation unit among a plurality of operating modes;

switching said blurring motion compensation operation changeover operation to a specific operating mode comprising locking, unlocking and engaging the blurring motion of compensation unit; and locking said blurring motion compensation optical system.

22. A method of motion compensation, comprising the steps of:

compensating for blurring motion by driving a blurring motion compensation optical system in a direction orthogonal to the optical axis;

locking said blurring motion compensation optical system;

controlling the operation of said locking step of said blurring motion compensation optical system; and actuating locking of said blurring motion compensation optical system independent of said step of controlling the operation of said locking step through an entirely mechanical sliding mechanism without the use of a power supply or electricity.

23. A method of motion compensation as recited in claim 22, further comprising the steps of:

moving said blurring motion compensation optical system in the optical axis direction; and locking said blurring motion compensation optical system independent of a movement position of said blurring motion compensation optical system.

24. A method of motion compensation as recited in claim 22, wherein said locking step further comprising the steps of:

changing over the operation of said blurring motion compensation optical system among a plurality of operating modes;

switching said blurring motion compensation operation changeover operation to a specific operating mode comprising locking, unlocking and engaging the blurring motion of compensation unit; and locking said blurring motion compensation optical system independent of the control operation.

25. A motion compensation device, comprising:

means for compensating for blurring motion using a blurring motion compensation unit driving a blurring motion compensation optical system in a direction orthogonal to the optical axis;

means for locking and unlocking said blurring motion compensation optical system without a power supply and electricity through an entirely mechanical sliding mechanism.

26. A motion compensation device as recited in claim 25, further comprising:

means for moving said blurring motion compensation optical system in the optical axis direction; and means for locking said blurring motion compensation optical system independent of a movement position of said blurring motion compensation optical system.

27. A motion compensation device as recited in claim 25, wherein said means for locking further comprises:

means for changing over the operation of said blurring motion compensation unit among a plurality of operating modes;

means for switching said blurring motion compensation operation changeover operation to a specific operating mode comprising locking, unlocking and engaging the blurring motion of compensation unit; and means for locking said blurring motion compensation optical system.

28. A motion compensation device, comprising:

means for compensating for blurring motion by driving a blurring motion compensation optical system in a direction orthogonal to the optical axis; and means for locking and unlocking said blurring motion compensation optical system independent of the operation of said blurring motion compensation optical system without the use of a power supply or electricity through an entirely mechanical sliding mechanism.

29. A motion compensation device as recited in claim 28, further comprising:

means for moving said blurring motion compensation optical system in the optical axis direction; and means for locking said blurring motion compensation optical system independent of a movement position of said blurring motion compensation optical system.

30. A motion compensation device as recited in claim 28, wherein said locking means further comprises:

means for changing over the operation of said blurring motion compensation unit among a plurality of operating modes;

means for switching said blurring motion compensation operation changeover operation to a specific operating mode comprising locking, unlocking and engaging the blurring motion of compensation unit; and means for locking said blurring motion compensation optical system by use of said locking member.

31. A motion compensation device, comprising:

means for compensating for blurring motion driving a blurring motion compensation optical system in a direction substantially at a right angle to the optical axis;

means for locking and unlocking of said blurring motion compensation optical system;

means for controlling the operation of said means for locking; and means for actuating locking and unlocking of said blurring motion compensation optical system using said means for locking and unlocking, independent of the control operation of said means for controlling without the use of a power supply or electricity through an entirely mechanical sliding mechanism.

32. A motion compensation device as recited in claim 31, further comprising:

means for moving said blurring motion compensation optical system in the optical axis direction; and means for locking said blurring motion compensation optical system by said means for locking independent of a movement position of said blurring motion compensation optical system.

33. A motion compensation device as recited in claim 31, wherein said means for locking further comprises:

means for changing over the operation of said means for compensating among a plurality of operating modes comprising locking, unlocking and engaging the blurring motion of compensation unit; and means for locking said blurring motion compensation optical system independent of the control operation of said means for controlling.

34. A camera comprising:

a camera body having a power supply;

a lens barrel, connectable to said camera body;

a control unit in said camera body to control operation of said camera;

a blurring motion compensation unit in said lens barrel to compensate for blurring motion and having a blurring motion compensation optical system in said lens barrel driveable in a direction orthogonal to the optical axis; and a locking actuation member to cause locking and unlocking of said blurring motion compensation optical system without requiring said power supply or electricity through an entirely mechanical mechanism by sliding along a lens barrel and independent of said control unit and said blurring motion compensation unit.

35. A camera comprising:

a camera body having a power supply;

a lens barrel, connectable to said camera body;

a control unit in said camera body to control operation of said camera;

a blurring motion compensation unit in said lens barrel to compensate for blurring motion and having a blurring motion compensation optical system in said lens barrel driveable in a direction orthogonal to the optical axis; and a locking actuation member to cause locking of said blurring motion compensation optical system without requiring said power supply or electricity through an entirely mechanical mechanism by sliding along a lens barrel.

36. A camera comprising:

a camera body having a power supply;

a lens barrel, connectable to said camera body;

a control unit in said camera body to control operation of said camera;

a blurring motion compensation unit in said lens barrel to compensate for blurring motion and having a blurring motion compensation optical system in said lens barrel driveable in a direction orthogonal to the optical axis; and a locking actuation member to cause locking and unlocking of said blurring motion compensation optical system, independent of said control unit and said blurring motion compensation unit and entirely through the use of a mechanical mechanism by sliding along a lens barrel without the use of a power supply or electricity.

* * * * *

UNITED STATES PATENT AND TRADEMARK OFFICE
CERTIFICATE OF CORRECTION

PATENT NO.:   5,974,270
DATED     :   October 26, 1999
INVENTOR(S):  Yoshio Imura, et al.

It is certified that error appears in the above-identified patent and that said Letters Patent is hereby corrected as shown below:

Column 18, line 15, (claim 7), after "recited" insert --in claim--;

Column 19, line 42, (claim 14), after ";" insert --and--;

Column 19, line 62, (claim 16), change first occurrence of "said" to --and--.

Signed and Sealed this

Eighteenth Day of July, 2000

Attest:

Q. TODD DICKINSON

*Attesting Officer*                *Director of Patents and Trademarks*